(12) United States Patent
Fujita et al.

(10) Patent No.: US 12,196,571 B2
(45) Date of Patent: Jan. 14, 2025

(54) TRAVEL ROUTE SETTING SYSTEM, TRAVEL ROUTE SETTING METHOD, AND PROGRAM

(71) Applicant: DENSO CORPORATION, Kariya (JP)

(72) Inventors: Taishi Fujita, Kariya (JP); Katsuyuki Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 276 days.

(21) Appl. No.: 17/647,321

(22) Filed: Jan. 6, 2022

(65) Prior Publication Data

US 2022/0128377 A1 Apr. 28, 2022

Related U.S. Application Data

(63) Continuation of application No. PCT/JP2020/023047, filed on Jun. 11, 2020.

(30) Foreign Application Priority Data

Jul. 10, 2019 (JP) .................................. 2019-128181

(51) Int. Cl.
*G01C 21/16* (2006.01)
*G01C 21/34* (2006.01)
(Continued)

(52) U.S. Cl.
CPC ..... *G01C 21/3691* (2013.01); *G01C 21/1656* (2020.08); *G01C 21/3415* (2013.01); *G01C 21/3492* (2013.01)

(58) Field of Classification Search
CPC ....... B60W 50/0098; B60W 2520/105; B60W 2554/802; B60W 2552/10;
(Continued)

(56) References Cited

U.S. PATENT DOCUMENTS

2017/0313297 A1 11/2017 Okada et al.
2018/0202823 A1* 7/2018 Maekawa .............. G06V 10/56
(Continued)

FOREIGN PATENT DOCUMENTS

JP 8-159800 A 6/1996
JP H08159800 A * 6/1996
(Continued)

*Primary Examiner* — Ian Jen
*Assistant Examiner* — Hossam M Abd El Latif
(74) *Attorney, Agent, or Firm* — Maschoff Brennan

(57) ABSTRACT

A travel route setting system is provided. A passage time estimation section estimates a passage time at which a vehicle passes each of stop lines located before traffic lights present in a traveling direction on each of routes from a vehicle position to a destination. A solar position calculation section calculates a position of the sun at the passage time of each of the stop lines based on the position and the passage time of each stop line. The backlight margin value calculation section calculates a backlight margin value. A route backlight margin value calculation section calculates a route backlight margin value based on the backlight margin value of each of the stop lines present on each of the routes from the vehicle position to the destination. A route determination section determines a travel route from the vehicle position to the destination using the route backlight margin values.

9 Claims, 12 Drawing Sheets

(51) Int. Cl.
*G01C 21/36* (2006.01)
*G06T 7/00* (2017.01)
*G08G 1/00* (2006.01)

(58) Field of Classification Search
CPC ......... B60W 30/18163; G01C 21/3691; G01C
21/1656; G01C 21/3415; G01C 21/3492;
G01C 21/3461; G08G 1/00; G06T 7/00;
G06V 20/56; G06V 20/58; G06V 20/588
USPC ........................................................ 701/301
See application file for complete search history.

(56) References Cited

U.S. PATENT DOCUMENTS

2019/0180502 A1\* 6/2019 Englard ................. G06V 10/82
2019/0186931 A1\* 6/2019 Dittmer ................ G05D 1/0246

FOREIGN PATENT DOCUMENTS

| JP | 2007-315799 A | 12/2007 |
| JP | 2016-024572 A | 2/2016 |
| JP | 2017-004295 A | 1/2017 |
| JP | 2017-062172 A | 3/2017 |
| JP | 2017062539 A \* | 3/2017 |
| JP | 2017-182297 A | 10/2017 |

\* cited by examiner

TRAVEL ROUTE SETTING SYSTEM, TRAVEL ROUTE SETTING METHOD, AND PROGRAM

CROSS-REFERENCE TO RELATED APPLICATION

The present application is based on and claims the benefit of priority from earlier Japanese Patent Application No. 2019-128181 filed Jul. 10, 2019, the description of which is incorporated herein by reference.

BACKGROUND

Technical Field

The present disclosure relates to a travel route setting system, a travel route setting method, and a program.

Related Art

Level 4 automated driving (automated driving in a limited area) requires reliably recognizing traffic lights when traveling across an intersection or a pedestrian crossing within a drivable region.

SUMMARY

As an aspect of the present disclosure, a travel route setting system is provided which includes:

a passage time estimation section, which, based on an input destination, a vehicle position, which is a position of a vehicle, and map information including information about positions of traffic lights, extracts positions of stop lines located before the traffic lights that are present in a traveling direction on each of routes from the vehicle position to the destination and estimates a passage time at which the vehicle passes each of the extracted stop lines;

a solar position calculation section that calculates a position of the sun at the passage time of each of the stop lines based on the position of each stop line and the passage time of each stop line;

a camera information acquisition section that acquires camera information including an angle of view of a camera mounted to the vehicle, a mounting angle of the camera, and a mounting position of the camera;

a backlight margin value calculation section that calculates, for each of the stop lines, a distance between the associated traffic light and the sun on an image when the image of the traffic light is captured by the camera based on the position of each stop line, the position of the associated traffic light, the position of the sun at the passage time of each stop line, and the camera information, and calculates a backlight margin value corresponding to the calculated distance on the image based on a relationship between the distance and the backlight margin value previously determined so that the backlight margin value increases as the distance increases;

a route backlight margin value calculation section that calculates a route backlight margin value based on the backlight margin value of each of the stop lines that are present on each of the routes from the vehicle position to the destination; and a route determination section that determines a travel route from the vehicle position to the destination by using the route backlight margin value calculated for each of the routes.

DETAILED DESCRIPTION OF THE PREFERRED EMBODIMENTS

Level 4 automated driving (automated driving in a limited area) requires reliably recognizing traffic lights when traveling across an intersection or a pedestrian crossing within a drivable region. Methods for recognizing traffic lights include an image recognition method that recognizes the color of a traffic light and a recognition method that acquires information from, for example, a beacon mounted on the traffic light. Unfortunately, the penetration rate of traffic light beacons is not high. Even when traffic light beacons are used, the image recognition method that recognizes the color of the traffic light is a necessary technique.

Furthermore, the level 4 automated driving may previously set an area where automated driving cannot be performed (for example, a road environment that is out of the specification of the recognition device or when continuation of traveling cannot be guaranteed because of, for example, an obstacle that is unavoidable due to the specification) and may plan a travel route avoiding the predetermined area (for example, JP 2017-62172 A). Hereinafter, the area in which a vehicle can be driven will be referred to as a driving plannable region, and others will be referred to as being "driving-non-plannable region".

Unfortunately, as a result of a close examination, the inventors found that there is a probability that the traffic light (or the color of the traffic light) cannot be recognized or is erroneously recognized due to backlighting by the sun, which may lead to a failure in obtaining an appropriate result in recognizing the traffic light and thus to making a wrong decision of moving forward or stopping the vehicle.

It is an object of the present disclosure to provide a travel route setting system, a travel route setting method, and a program that set a route that reduces the risk of failing to detect or erroneously recognizing a traffic light and allows correctly recognizing traffic lights.

Embodiments of the present disclosure will hereafter be described with reference to the drawings. The following embodiments describe a case in which a vehicle travels on a route to a destination determined by an automated driving center through automated driving control performed by a vehicle-mounted device, which is mounted to the vehicle, in level 4 automated driving.

Figure 1:
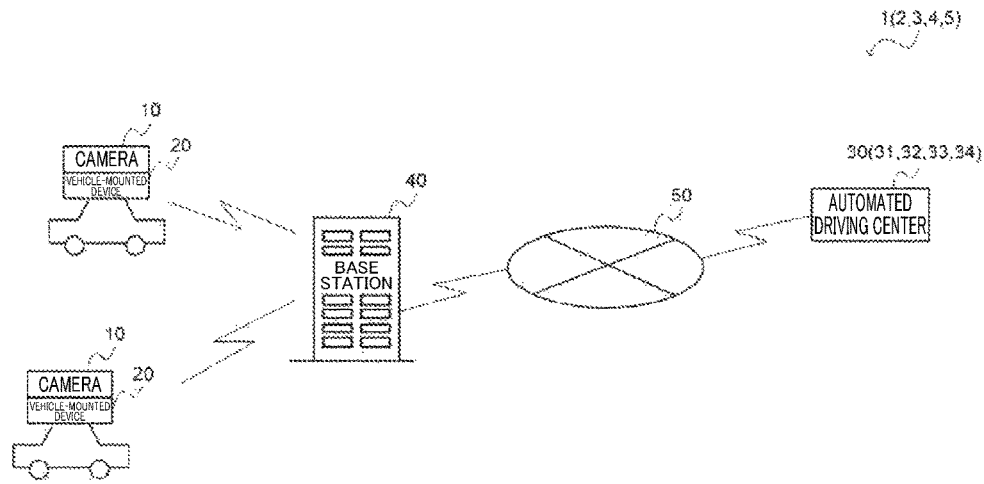
FIG. 1 is a block diagram illustrating the configuration of a travel route setting system according to a first embodiment.

Configuration of Travel Route Setting System According To First Embodiment of Present Disclosure A travel route setting system 1 according to an embodiment of the present disclosure will be described with reference to FIG. 1. FIG. 1 is a block diagram illustrating the configuration of the travel route setting system 1 according to an embodiment of the present disclosure. As shown in FIG. 1, the travel route setting system 1 according to the first embodiment includes a camera 10 and a vehicle-mounted device 20, which are mounted to a vehicle, an automated driving center 30, a base station 40, and a network 50.

The base station 40 is a wireless base station that is connected to the network 50 and communicates with the vehicle-mounted device 20 through wireless communication. The network 50 is a public network such as the Internet and a wide-area Ethernet.

The camera 10 is a camera mounted to the vehicle. In the present embodiment, the angle of view of the camera 10, the mounting angle of the camera 10, and the mounting position of the camera 10 are fixed. Note that, the angle of view of the camera 10, the mounting angle of the camera 10, and the mounting position of the camera 10 may be movable by manual operation or automatic operation. In this case, these pieces of information are sequentially registered in the automated driving center 30.

Figure 2:
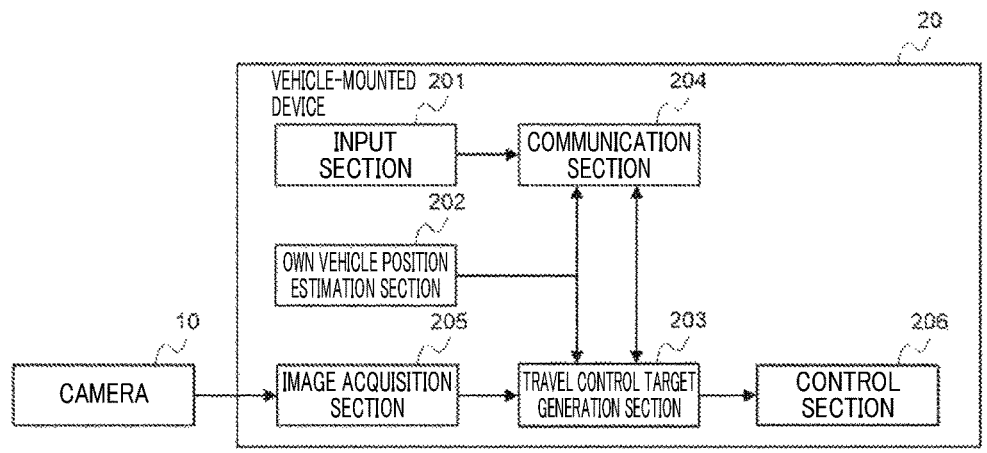
FIG. 2 is a block diagram illustrating the configuration of a camera and a vehicle-mounted device according to the present disclosure.

The vehicle-mounted device 20 executes automated driving control. The configuration of the vehicle-mounted device 20 according to the first embodiment will be described with reference to FIG. 2. Specifically, the vehicle-mounted device 20 is configured by a computer including a CPU, a RAM, and a ROM, which stores a program for executing an automated driving control routine, which will be discussed below. Functionally, the vehicle-mounted device 20 is configured as follows. As shown in FIG. 2, the vehicle-mounted device 20 of the present embodiment includes an input section 201, an own vehicle position estimation section 202, a travel control target generation section 203, a communication section 204, an image acquisition section 205, and a control section 206.

The input section 201 receives input of the destination from a user. Specifically, the input section 201 receives the input of the destination from the user of a vehicle that is automatically driven. The input section 201 transmits the received destination to the communication section 204.

The own vehicle position estimation section 202 estimates the current vehicle position. Specifically, the own vehicle position estimation section 202 estimates the current vehicle position based on values measured by a sensor (not shown) such as a global positioning system (GPS). The own vehicle position estimation section 202 transmits the estimated vehicle position to the travel control target generation section 203 and the communication section 204.

The travel control target generation section 203 generates control information necessary for automated driving control to the destination based on the vehicle position and a travel route. Specifically, upon acquiring the travel route set by the automated driving center 30 from the communication section 204, the travel control target generation section 203 generates the control information necessary for the automated driving control based on the vehicle position estimated by the own vehicle position estimation section 202 and the travel route and transmits the generated control information to the control section 206. The control information includes information necessary for performing automated driving such as braking force control information, which is information for controlling the braking force, drive control information, which is information for controlling the drive, and steering control information for controlling the steering. Furthermore, every time the travel control target generation section 203 acquires an image by the image acquisition section 205, the travel control target generation section 203 updates the control information based on the image and transmits the updated control information to the control section 206. For example, the travel control target generation section 203 recognizes the color of the light of the traffic light shown in the image and updates the control information based on the recognition result of the color of the light. The travel control target generation section 203 updates the control information until arriving at the destination.

The communication section 204 transmits the destination to the automated driving center 30 through the base station 40 and the network 50. Furthermore, the communication section 204 transmits the current vehicle position to the automated driving center 30 through the base station 40 and the network 50. Additionally, the communication section 204 receives the travel route determined by the automated driving center 30 from the automated driving center 30 through the base station 40 and the network 50. The communication section 204 transmits the received travel route to the travel control target generation section 203.

The image acquisition section 205 acquires the image captured by the camera 10. The image acquisition section 205 transmits the acquired image to the travel control target generation section 203.

The control section 206 performs the automated driving control based on the control information generated by the travel control target generation section 203. Specifically, the control section 206 executes controls such as the braking force control based on the braking force control information, the drive control based on the drive control information, and the steering control based on the steering control information.

Figure 3:
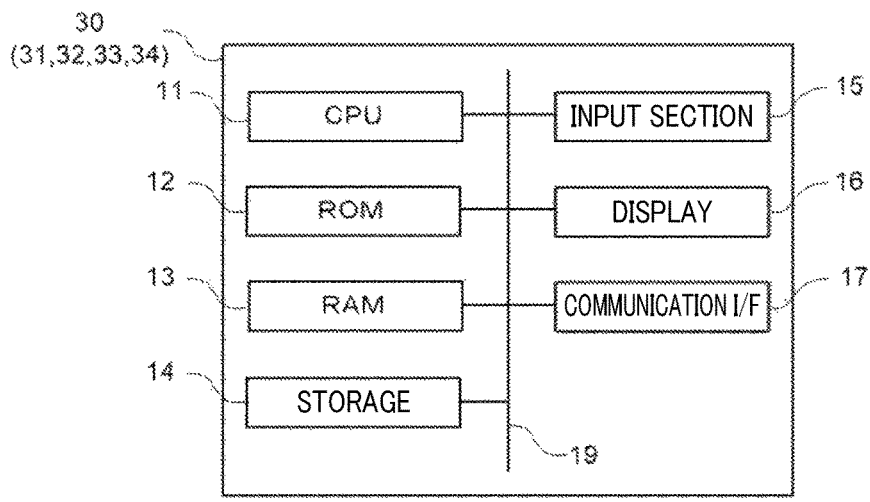
FIG. 3 is a block diagram illustrating the schematic configuration of a computer that functions as an automated driving center according to the present disclosure.

The automated driving center 30 determines a travel route for performing the automated driving. The configuration of the automated driving center 30 according to the first embodiment will be described with reference to FIGS. 3 and 4. FIG. 3 is a block diagram illustrating the hardware configuration of the automated driving center 30 according to the present embodiment. As shown in FIG. 3, the automated driving center 30 includes a central processing unit (CPU) 11, a read-only memory (ROM) 12, a random-access memory (RAM) 13, a storage 14, an input section 15, a display 16, and a communication interface (I/F) 17. The components are communicably connected to each other through a bus 19.

The CPU 11 (computer) executes a variety of programs and controls each section. That is, the CPU 11 reads a program from the ROM 12 or the storage 14 (non-transitory storage medium) and executes the program on the RAM 13, which serves as a workspace. The CPU 11 controls the above components and performs a variety of computation processes in accordance with the programs stored in the ROM 12 or the storage 14. In the present embodiment, the ROM 12 or the storage 14 stores an abnormality detection program for executing an abnormality detection process.

The ROM 12 stores a variety of programs and a variety of data. The RAM 13 serves as the workspace to temporarily store a program or data. The storage 14 includes a hard disk drive (HDD) or a solid state drive (SSD) and stores a variety of programs including an operating system and a variety of data.

The input section 15 includes a pointing device such as a mouse and a keyboard and is used for a variety of inputs.

The display 16 is, for example, a liquid crystal display and displays a variety of kinds of information. The display 16 may be a touch panel and function as the input section 15.

The communication interface 17 is an interface for communicating with other devices and uses standards such as Ethernet™, FDDI, and Wi-Fi™.

Figure 4:
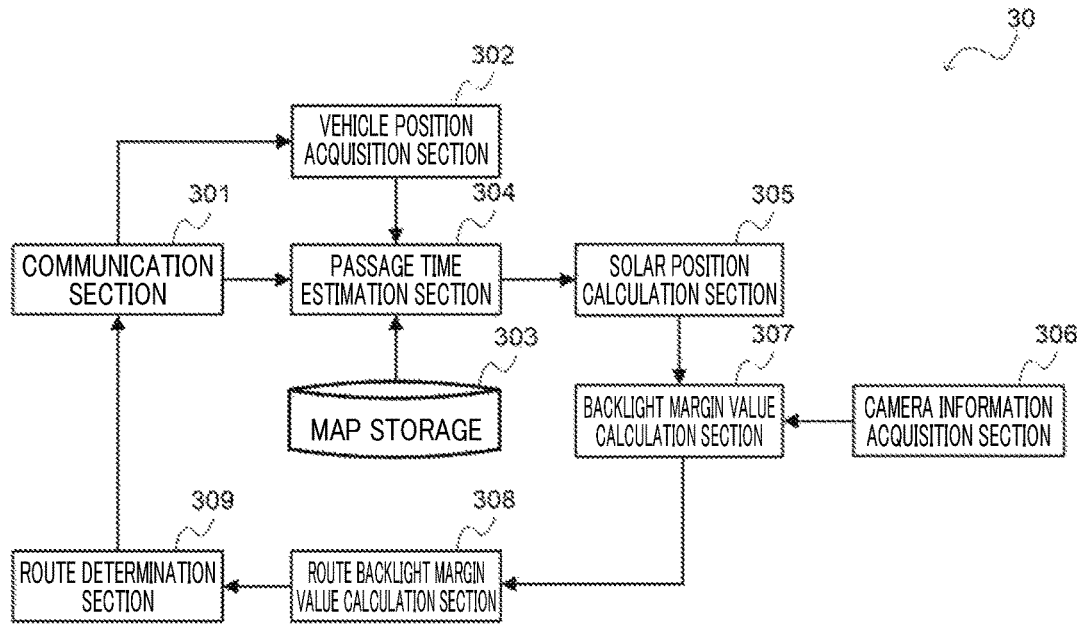
FIG. 4 is a block diagram illustrating an example of a functional configuration of the automated driving center according to the first embodiment.

Next, the functional configuration of the automated driving center 30 will be described. FIG. 4 is a block diagram illustrating an example of the functional configuration of the automated driving center 30. As shown in FIG. 4, the automated driving center 30 according to the present embodiment includes a communication section 301, a vehicle position acquisition section 302, a map storage 303, a passage time estimation section 304, a solar position calculation section 305, a camera information acquisition section 306, a backlight margin value calculation section 307, a route backlight margin value calculation section 308, and a route determination section 309.

The communication section 301 communicates with the vehicle-mounted device 20 through the network 50. Specifically, the communication section 301 receives the destination from the vehicle-mounted device 20. The communication section 301 transmits the received destination to the passage time estimation section 304. Furthermore, the communication section 301 receives the vehicle position from the vehicle-mounted device 20. The communication section 301 transmits the received vehicle position to the vehicle position acquisition section 302. Additionally, the communication section 301 transmits the travel route determined by the route determination section 309 to the vehicle-mounted device 20 through the network 50.

The vehicle position acquisition section 302 acquires the current vehicle position of the vehicle. Specifically, the vehicle position acquisition section 302 transmits the vehicle position acquired from the communication section 301 to the passage time estimation section 304. Note that, the vehicle position acquisition section 302 may be configured to acquire the current vehicle position of the vehicle from, for example, an automated driving history. In this case, the vehicle position acquisition section 302 stores the vehicle position in the automated driving history. The vehicle position acquisition section 302 only needs to set the last one of the vehicle positions stored in the automated driving history as the current vehicle position.

The map storage 303 stores map information including the positions and the heights of traffic lights on the map and the positions of stop lines located before the traffic lights. The map information may be, for example, a dynamic map.

The passage time estimation section 304 extracts, based on the destination, the vehicle position, and the map information, the positions of the stop lines located before the traffic lights that are present in a traveling direction on each of routes from the vehicle position to the destination and estimates the passage time at which the vehicle passes each of the extracted stop lines.

Specifically, the passage time estimation section 304 first acquires the map information from the map storage 303. Next, the passage time estimation section 304 extracts the positions of the stop lines located before the traffic lights that are present between the vehicle position and the destination. At this time, the passage time estimation section 304 extracts the positions of the stop lines located before the traffic lights with the direction in which the vehicle travels from the vehicle position toward the destination set as the traveling direction. Subsequently, the passage time estimation section 304 estimates the passage time of the vehicle for each of the positions of the extracted stop lines. More specifically, the passage time estimation section 304 estimates the time at which the vehicle passes the position of each stop line based on the map information by using the distance between the vehicle position and the position of each stop line and the normal traveling speed (such as the legal speed) of the vehicle. The passage time estimation section 304 transmits the destination, the vehicle position, the map information, the extracted positions of the stop lines, and the estimated passage time of the position of each stop line to the solar position calculation section 305.

The solar position calculation section 305 calculates, for each of the stop lines, the position of the sun at the passage time of each of the stop lines based on the position of each stop line and the passage time of each stop line. Specifically, the solar position calculation section 305 calculates the altitude of the sun and the direction of the sun with respect to the position of each stop line at the passage time of each of the stop lines. The passage time may include the date, and the position of the stop line may include the information regarding the country and the district. The altitude and the direction of the sun may be calculated in accordance with the season, the country, and the district. The solar position calculation section 305 transmits the destination, the vehicle position, the map information, the extracted positions of the stop lines, the estimated passage time of the position of each stop line, and the calculated position of the sun at the passage time of each stop line to the backlight margin value calculation section 307.

The camera information acquisition section 306 acquires camera information including the angle of view of the camera 10, the mounting angle of the camera 10, and the mounting position of the camera 10. Specifically, the camera information acquisition section 306 acquires the camera information of the camera 10 mounted to the vehicle from a database (not shown) that previously holds the camera information including the angle of view of the camera 10 mounted to the vehicle, the mounting angle of the camera 10, and the mounting position of the camera 10. The mounting position of the camera 10 includes the distance (m) between the camera 10 and the road surface in the vertical direction, the distance (m) between the vehicle center and the camera 10, which is located rightward from the vehicle center with respect to the traveling direction, and the distance (m) between the vehicle front end and the camera 10, which is located apart from the vehicle front end in the direction toward the vehicle rear end. The camera information acquisition section 306 transmits the camera information to the backlight margin value calculation section 307.

Figure 5:
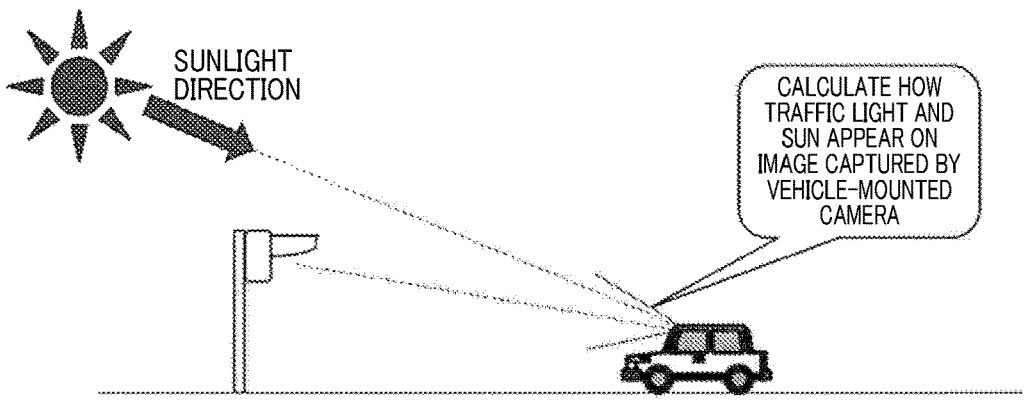
FIG. 5 is a conceptual diagram illustrating a relationship between the position of the camera, the position of the sun, and the position of a traffic light when a vehicle is located before a stop line.
Figure 6:
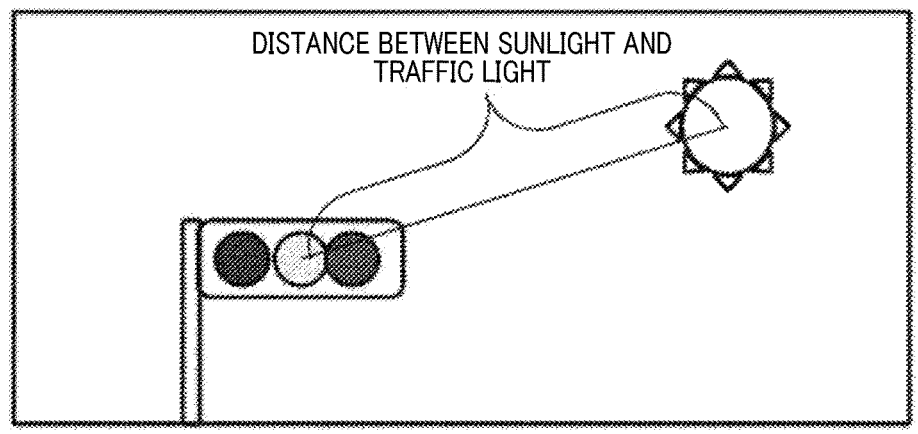
FIG. 6 is a conceptual diagram illustrating an example of an image assumed to be captured by the camera and a distance between the sunlight and the traffic light.
Figure 7:
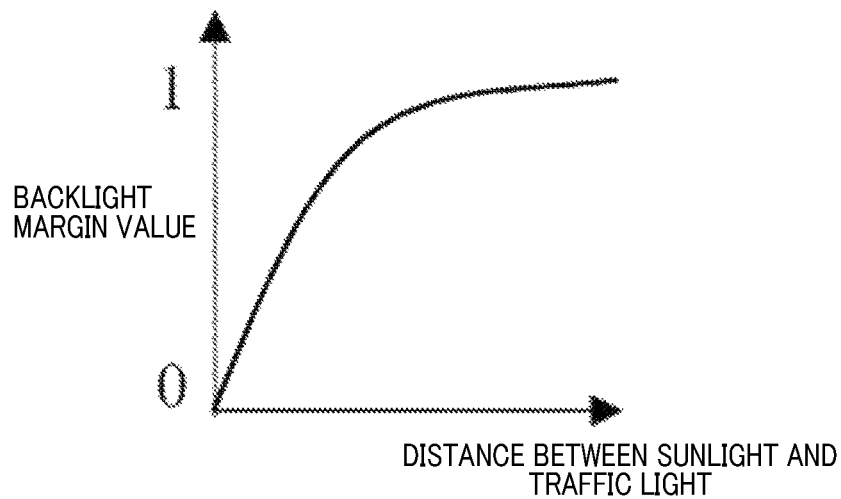
FIG. 7 is a diagram illustrating an example of a relationship between a backlight margin value and the distance between the sunlight and the traffic light.

The backlight margin value calculation section 307 calculates, for each of the stop lines, a backlight margin value, which increases with an increase in the distance between the traffic light and the sun as viewed from the position of each stop line, based on the position of each stop line, the position of the associated traffic light, and the position of the sun. Specifically, the backlight margin value calculation section 307 calculates, for each of the stop lines, the backlight margin value, which increases with an increase in the distance between the traffic light on an image and the sun on the image when the image of the traffic light is captured by the camera 10 from the position of each stop line, based on the position of each stop line, the position of the associated traffic light, the position of the sun at the passage time of each stop line, and the camera information. More specifically, the backlight margin value calculation section 307 first calculates the position of the traffic light and the position of the sun on the image captured by the camera 10 when the vehicle is located before the stop line based on the position of the stop line, the position of the sun at the passage time of the stop line, the position of the traffic light associated with the stop line, and the camera information. FIG. 5 is a conceptual diagram showing a relationship between the position of the camera 10, the position of the sun, and the position of the traffic light when the vehicle is located before the stop line. Based on the camera information of the camera 10, it is possible to calculate which area with a central focus on which point will be captured by the camera 10, that is, an image plane on a three-dimensional space. Furthermore, the position of the traffic light on the image plane and the position of the sun on the image plane can be calculated when the position of the traffic light, the position of the sun, and the position of the camera 10 are known. Next, the backlight margin value calculation section 307 calculates the distance between the sunlight and the traffic light, that is, the distance between the position of the traffic light on the image and the position of the sun on the image. FIG. 6 shows an example of an image assumed to be captured by the camera 10 and the distance between the sunlight and the traffic light. The position of the traffic light on the image may be the center of the traffic light as shown in FIG. 6, but may be any position on the traffic light that is affected by the backlight. Subsequently, the backlight margin value calculation section 307 calculates the backlight margin value, which increases with an increase in the distance between the sunlight and the traffic light. In the present disclosure, the backlight margin value takes a value in a range of 0 to 1. In this case, the closer the backlight margin value to 1, the longer the distance between the sunlight and the traffic light and the smaller the influence of the backlight. Whereas, the closer the backlight margin value to 0, the shorter the distance between the sunlight and the traffic light and the greater the influence of the backlight. When the distance between the sunlight and the traffic light is 0, that is, when the position of the traffic light on the image coincides with the position of the sun on the image, the influence of the backlight is regarded as the maximum. Any formula may be used for calculating the backlight margin value. For example, as shown in FIG. 7, a formula may be used in which the distance between the sunlight and the traffic light linearly corresponds to the backlight margin value when the distance is small, and the backlight margin value gradually approaches 1 when the distance is greater than a predetermined value. The backlight margin value calculation section 307 performs the above processes for all the stop lines. Additionally, when the sun does not appear on the image, the backlight margin value calculation section 307 sets the backlight margin value to 1. That is, when the sun does not appear on the image, the influence of the backlight is small. Thus, in this case, the backlight margin value calculation section 307 sets the backlight margin value to 1. The backlight margin value calculation section 307 transmits the map information, the extracted positions of the stop lines, and the backlight margin values of the stop lines to the route backlight margin value calculation section 308.

Figure 8:
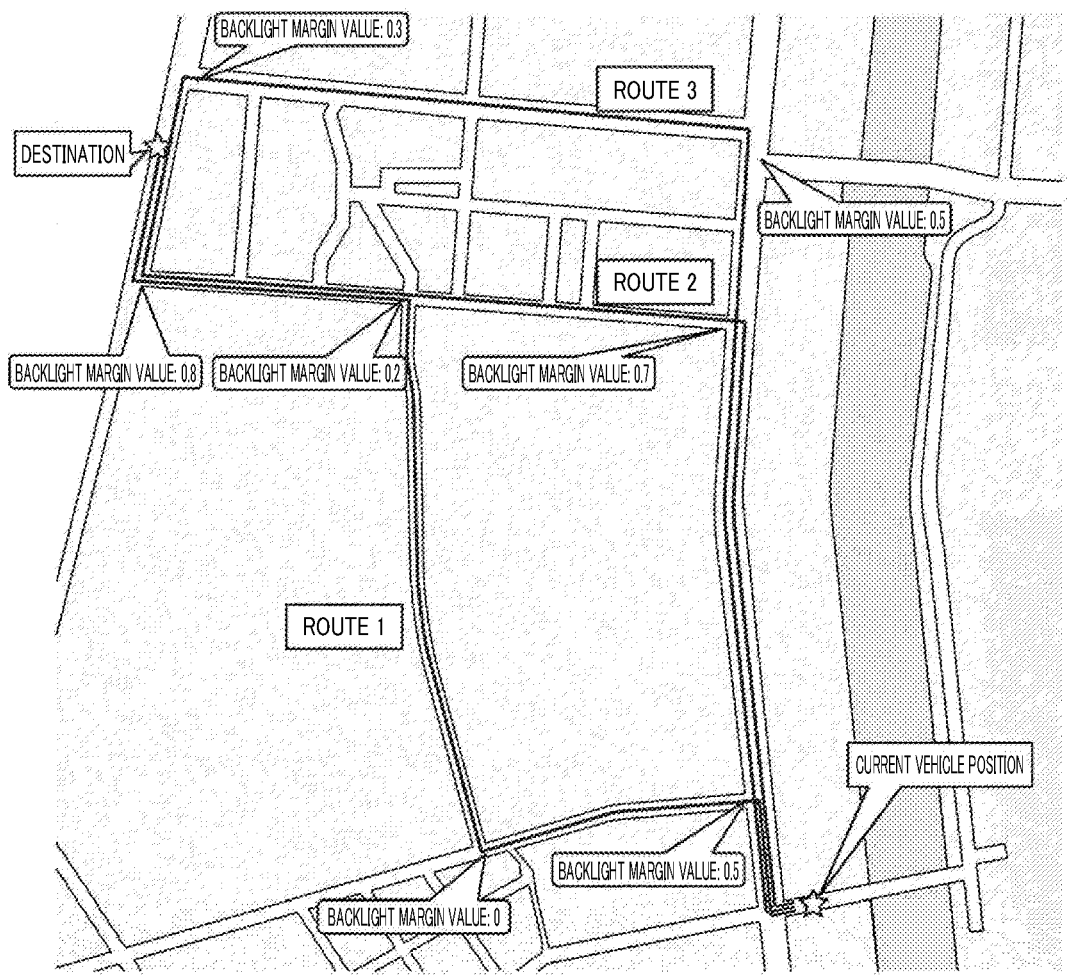
FIG. 8 is a conceptual diagram illustrating an example of all routes and backlight margin values.

The route backlight margin value calculation section 308 calculates a route backlight margin value based on the backlight margin values of the stop lines that are present on each of the routes from the vehicle position to the destination. Specifically, the route backlight margin value calculation section 308 first obtains all the routes that pass stop lines from the vehicle position to the destination. In obtaining all the routes, an indirect route is excluded, but the route is not limited to the shortest route. FIG. 8 shows an example of all the routes. The example in FIG. 8 obtains three routes that pass stop lines. Next, the route backlight margin value calculation section 308 calculates the route backlight margin value based on the backlight margin values of the stop lines included in each of the obtained routes. For example, the route backlight margin value calculation section 308 sets a value obtained by multiplying the backlight margin values of the stop lines in each route as the route backlight margin value. The route backlight margin value may be the weighted sum of the backlight margin values of the stop lines in each route or can be obtained in many different ways. In the example of FIG. 8, the route backlight margin value of each route is calculated as follows.

[Route 1]

The backlight margin values included in Route 1 are 0.5, 0, 0.2, 0.8. This gives Route backlight margin value=0.5×0×0.2×0.8=0

[Route 2]

The backlight margin values included in Route 2 are 0.5, 0.7, 0.2, 0.8. This gives Route backlight margin value=0.5×0.7×0.2×0.8=0.056

[Route 3]

The backlight margin values included in Route 3 are 0.5, 0.5, 0.3. This gives

Route backlight margin value=0.5×0.5×0.3=0.075

The route backlight margin value calculation section 308 transmits the map information, all the obtained routes, and the route backlight margin values of the routes to the route determination section 309.

The route determination section 309 determines the travel route from the vehicle position to the destination by using the route backlight margin value calculated for each of the routes. Specifically, the route determination section 309 determines the route with the maximum route backlight margin value as the travel route. For example, in the example of FIG. 8, the route with the maximum route backlight margin value is Route 3. Thus, the route determination section 309 determines Route 3 as the travel route. The route determination section 309 transmits the determined travel route and the map information to the communication section 301.

Figure 9:
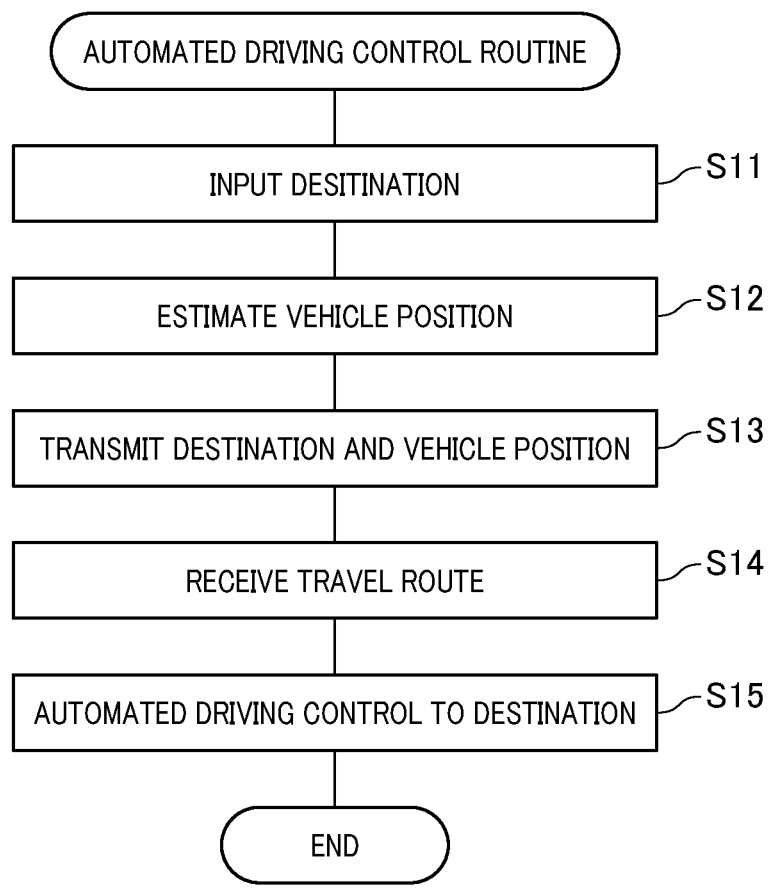
FIG. 9 is a flowchart showing an automated driving control routine according to the embodiment of the present disclosure.

Operation of Travel Route Setting System According to First Embodiment of Present Disclosure FIG. 9 is a flowchart showing an automated driving control routine according to the embodiment of the present disclosure.

Upon input of the destination in the input section 201, the automated driving control routine shown in FIG. 9 is executed by the vehicle-mounted device 20 of the travel route setting system 1.

First, at step S11, the input section 201 receives input of the destination from the user.

At step S12, the own vehicle position estimation section 202 estimates the current vehicle position.

At step S13, the communication section 204 transmits the destination and the vehicle position to the automated driving center 30 through the base station 40 and the network 50.

At step S14, the communication section 204 receives the travel route determined at step S110 from the automated driving center 30 through the base station 40 and the network 50.

At step S15, the vehicle-mounted device 20 performs the automated driving control to the destination, and the routine is terminated. During this time, the color of the light of traffic lights shown in images captured by the camera 10 is recognized, and the automated driving control is performed by using the recognized result of the color of the lights.

Figure 10:
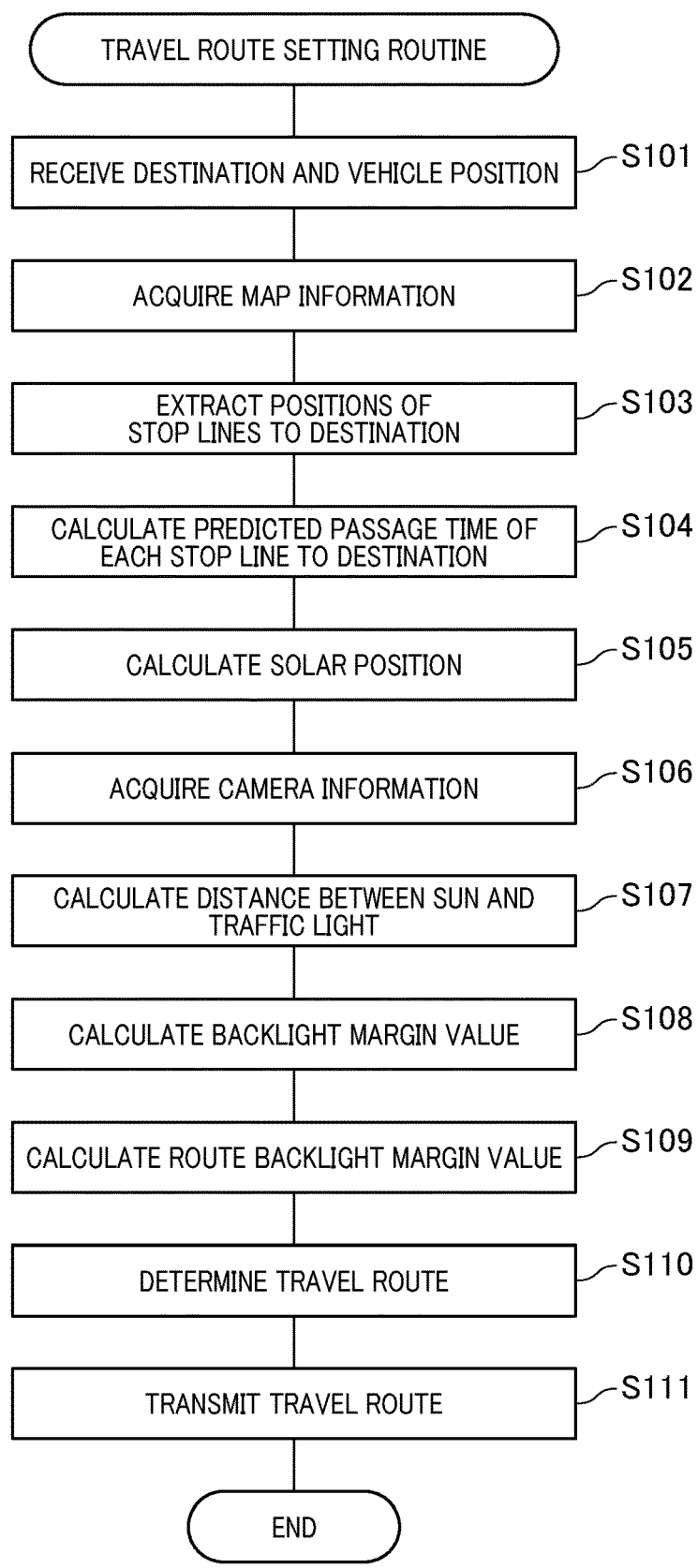
FIG. 10 is a flowchart showing a travel route setting routine of the travel route setting system according to the first embodiment.

FIG. 10 is a flowchart showing the travel route setting routine according to the embodiment of the present disclosure.

Upon receipt of the destination by the communication section 301, the automated driving center 30 of the travel route setting system 1 executes the travel route setting routine shown in FIG. 10.

At step S101, the communication section 301 receives the destination and the vehicle position from the vehicle-mounted device 20.

At step S102, the passage time estimation section 304 acquires the map information from the map storage 303.

At step S103, the passage time estimation section 304 extracts the positions of the stop lines located before the traffic lights that are present in the traveling direction on each of routes from the vehicle position to the destination based on the destination, the vehicle position, and the map information.

At step S104, the passage time estimation section 304 estimates the passage time at which the vehicle passes each of the stop lines extracted at step S103.

At step S105, the solar position calculation section 305 calculates, for each of the stop lines, the position of the sun at the passage time of each of the stop lines based on the position of each stop line and the passage time of each stop line.

At step S106, the camera information acquisition section 306 acquires the camera information including the angle of view of the camera 10, the mounting angle of the camera 10, and the mounting position of the camera 10.

At step S107, based on the position of each stop line, the position of the sun at the passage time of each stop line, the position of the traffic light associated with the stop line, and the camera information, the backlight margin value calculation section 307 calculates the position of the traffic light and the position of the sun on the image captured by the camera 10 when the vehicle is located before the stop line and calculates the distance between the sunlight and the traffic light, that is, the distance between the position of the traffic light on the image and the position of the sun on the image.

At step S108, the backlight margin value calculation section 307 calculates the backlight margin value, which increases with an increase in the distance between the sunlight and the traffic light.

At step S109, the route backlight margin value calculation section 308 calculates the route backlight margin value based on the backlight margin values of the stop lines that are present on each of the routes from the vehicle position to the destination.

At step S110, the route determination section 309 determines the travel route from the vehicle position to the destination by using the route backlight margin value calculated for each of the routes.

At step S111, the communication section 301 transmits the travel route determined at step S110 and the map information to the vehicle-mounted device 20 through the network 50.

As described above, the travel route setting system according to an embodiment of the present disclosure extracts the positions of the stop lines located before the traffic lights that are present in the traveling direction on each of routes from the vehicle position to the destination, estimates the passage time at which the vehicle passes each of the extracted stop lines, calculates the position of the sun at the passage time of each of the stop lines based on the position of each stop line and the passage time of each stop line, calculates a backlight margin value, which increases with an increase in the distance between the traffic light and the sun as viewed from the position of each stop line, calculates a route backlight margin value based on the backlight margin value of each of the stop lines that are present on each of the routes from the vehicle position to the destination, and determines a travel route from the vehicle position to the destination by using the route backlight margin value calculated for each of the routes, thereby setting the route that reduces the risk of failing to detect or erroneously recognizing a traffic light and allows correctly recognizing traffic lights.

When the sun does not appear on the image, the backlight margin value is set to a value greater than the case in which the sun appears on the image. Thus, the backlight margin value that represents the actual traffic light recognition environment is obtained. This enables setting the route that best reduces the risk of failing to detect or erroneously recognizing a traffic light and allows correctly recognizing traffic lights. This is because whether the sun appears on the image makes a large difference in the traffic light recognition. For this reason, the route on which the traffic lights can be correctly recognized is set.

Configuration of Travel Route Setting System According to Second Embodiment of Present Disclosure Next, the configuration of a travel route setting system 2 according to a second embodiment will be described. Note that, the components that are the same as the components of the travel route setting system 1 according to the first embodiment are given the same reference numerals, and detailed explanations thereof are omitted.

Figure 11:
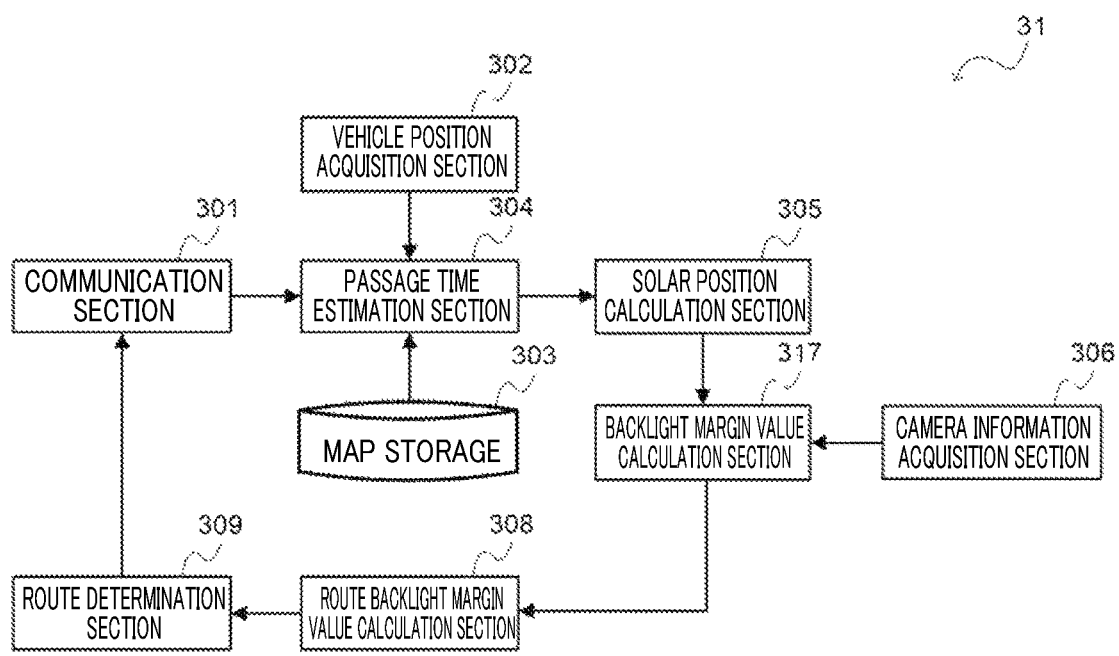
FIG. 11 is a block diagram illustrating an example of a functional configuration of an automated driving center according to a second embodiment.

As shown in FIG. 11, an automated driving center 31 according to the present embodiment includes the communication section 301, the vehicle position acquisition section 302, the map storage 303, the passage time estimation section 304, the solar position calculation section 305, the camera information acquisition section 306, a backlight margin value calculation section 317, the route backlight margin value calculation section 308, and the route determination section 309.

In the second embodiment, the map information further includes feature information, which is the information about the position and the height of features including buildings and natural objects on the map.

The backlight margin value calculation section 317 determines whether there is any shielding object that blocks the sun at the passage time of each of the stop lines as viewed from the position of each stop line based on the position of the sun at the passage time of each stop line and the map information. When a shielding object is present, the backlight margin value of the stop line is calculated to be a value greater than that when there is no shielding object.

Specifically, the backlight margin value calculation section 317 first obtains the feature that blocks the sun at the passage time of each of the stop lines as viewed from the position of each stop line based on the position of the sun at the passage time of each stop line and the map information and obtains the range of the shade formed by the feature. Subsequently, the backlight margin value calculation section 317 determines whether the sun will be hidden behind the feature when the vehicle is located before each of the stop lines at which the feature that blocks the sun is present. At this time, the determination may be made using the position of the camera 10 when the vehicle is located before each of the stop lines. Subsequently, when there is no stop line at which the sun will be hidden, the backlight margin value calculation section 317 obtains the backlight margin value of each stop line in the same manner as the backlight margin value calculation section 307. When there is a stop line at which the sun will be hidden, the backlight margin value calculation section 317 sets the backlight margin value to 1 for that stop line. For other stop lines, the backlight margin value calculation section 317 obtains the backlight margin value in the same manner as the backlight margin value calculation section 307.

Figure 12:
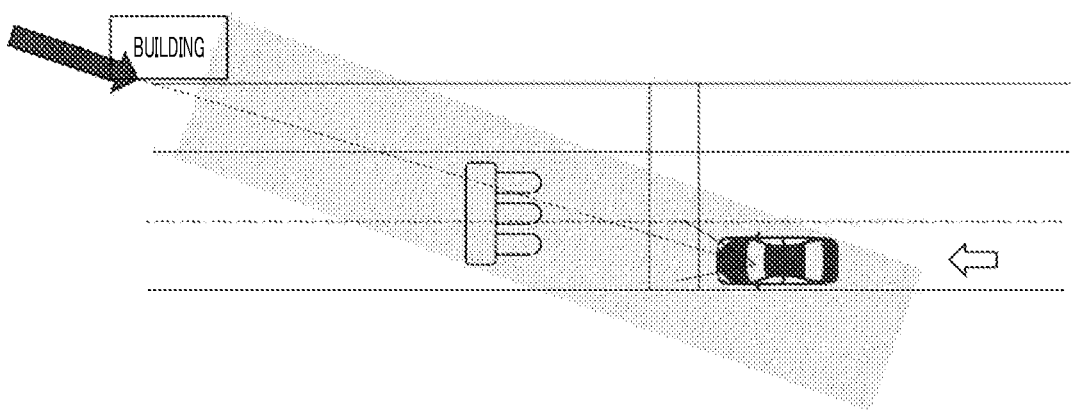
FIG. 12 is a conceptual diagram illustrating an example when the sun is hidden behind a feature.

FIG. 12 shows a conceptual diagram of an example in which the sun is hidden behind a feature. In the example of FIG. 12, the feature is a building, and the arrow indicates the direction of the sun's rays. In the example of FIG. 12, since the sun's rays are blocked by the building, and the vehicle is in the shade of the feature, that is, in the shade of the building, there is probably no influence of the backlight. As above, when it is determined that there is no influence of the backlight due to the feature while the image of the traffic light is being captured, the backlight margin value is set to 1.

The backlight margin value calculation section 317 transmits the map information, the extracted positions of the stop lines, and the backlight margin value of each of the stop lines to the route backlight margin value calculation section 308.

Figure 13:
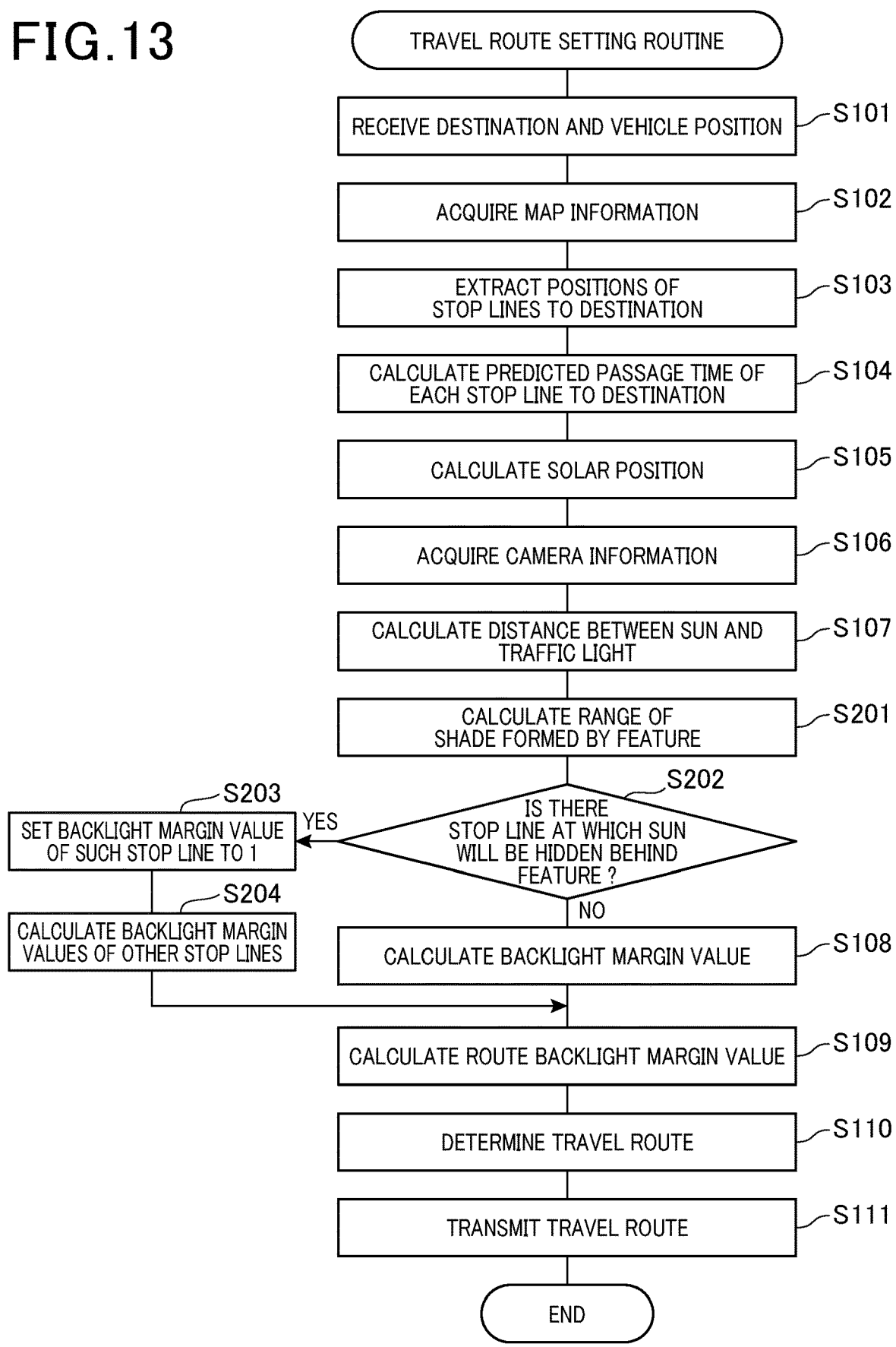
FIG. 13 is a flowchart showing a travel route setting routine of a travel route setting system according to the second embodiment.

Operation of Travel Route Setting System According to Second Embodiment of Present Disclosure FIG. 13 is a flowchart showing the travel route setting routine according to the second embodiment. Note that, the same reference numerals are given to those processes that are the same as the corresponding processes in the travel route setting routine according to the first embodiment, and detailed explanations thereof are omitted.

At step S201, the backlight margin value calculation section 317 obtains information on the feature that blocks the sun at the passage time of each of the stop lines as viewed from the position of each stop line based on the position of the sun at the passage time of each stop line and the map information and obtains the range of the shade formed by the feature.

At step S202, the backlight margin value calculation section 317 determines whether the sun will be hidden behind the feature when the vehicle is located before each of the stop lines at which the feature that blocks the sun is present.

When there is no stop line at which the sun will be hidden behind the feature (NO at step S202), the process proceeds to step S108.

When there is the stop line at which the sun will be hidden behind the feature (YES at step S202), at step S203, the backlight margin value calculation section 317 sets the backlight margin value to 1 for the stop line at which the sun will be hidden.

At step S204, the backlight margin value calculation section 317 obtains the backlight margin values for the stop lines other than the stop line at which the sun will be hidden in the same manner as at step S108.

As described above, in the travel route setting system according to the embodiment of the present disclosure, the backlight margin value calculation section 317 determines whether there is any shielding object that blocks the sun at the passage time of each of the stop lines as viewed from the position of each stop line based on the position of the sun at the passage time of each stop line and the map information. When a shielding object is present, the backlight margin value of the stop line is calculated to be a value greater than that when there is no shielding object. This enables setting the route that reduces the risk of failing to detect or erroneously recognizing a traffic light and allows correctly recognizing traffic lights.

Configuration of Travel Route Setting System According to Third Embodiment of Present Disclosure Next, the configuration of a travel route setting system 3 according to the third embodiment will be described. Note that, the components that are the same as the components of the travel route setting system 1 according to the first embodiment are given the same reference numerals, and detailed explanations thereof are omitted. While the second embodiment describes an example in which the shielding object is the feature, the third embodiment describes an example in which the shielding object is a cloud.

Figure 14:
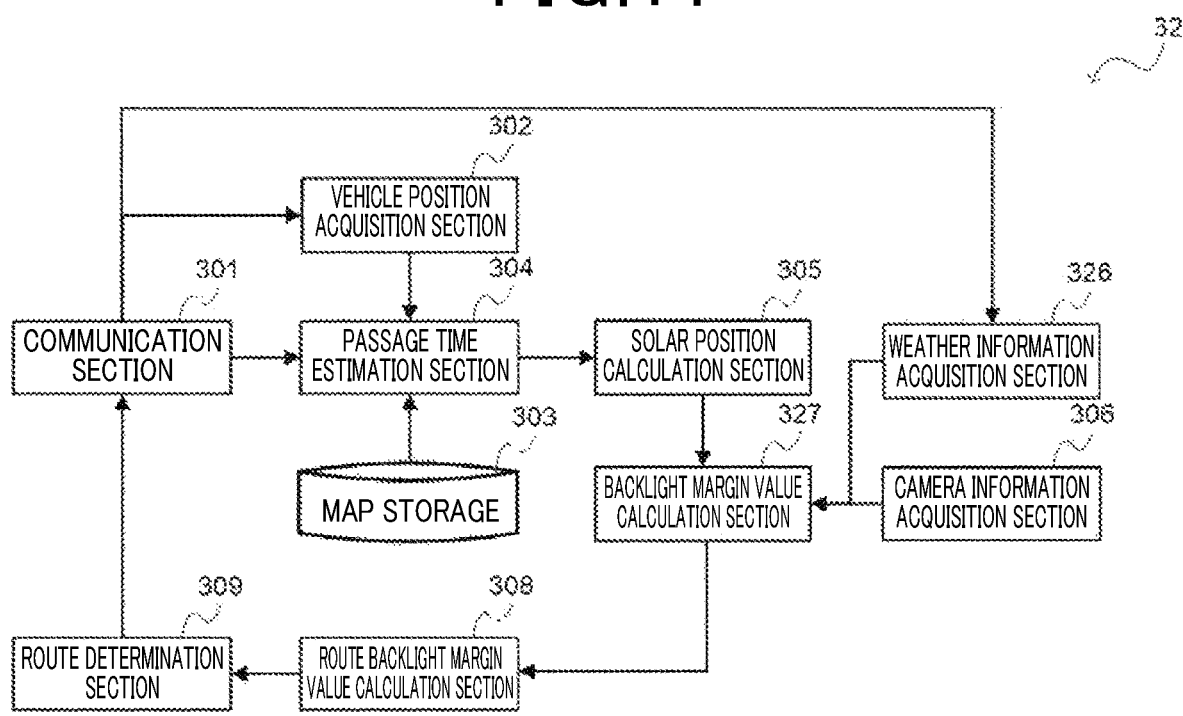
FIG. 14 is a block diagram illustrating an example of a functional configuration of an automated driving center according to a third embodiment.

As shown in FIG. 14, an automated driving center 32 according to the present embodiment includes the communication section 301, the vehicle position acquisition section 302, the map storage 303, the passage time estimation section 304, the solar position calculation section 305, the camera information acquisition section 306, a weather information acquisition section 326, a backlight margin value calculation section 327, the route backlight margin value calculation section 308, and the route determination section 309.

The weather information acquisition section 326 acquires the weather information including the position information of clouds. Specifically, the weather information acquisition section 326 acquires the weather information at the vehicle position or the destination from a weather information server (not shown) that distributes the weather information through the communication section 301 and the network 50. The weather information acquisition section 326 transmits the acquired weather information to the backlight margin value calculation section 327.

The backlight margin value calculation section 327 determines whether there is any cloud, which is a shielding object that blocks the sun, at the passage time of each of the stop lines as viewed from the position of each stop line based on the position of the sun at the passage time of each stop line, the map information, and the weather information acquired by the weather information acquisition section 326. When the cloud is present, the backlight margin value of the stop line is calculated to be a value greater than that when there is no cloud. Specifically, the backlight margin value calculation section 327 first obtains the cloud that blocks the sun at the passage time of each of the stop lines based on the position of the sun at the passage time of each stop line, the map information, and the position information of clouds from the weather information acquired by the weather information acquisition section 326. Subsequently, the backlight margin value calculation section 327 determines whether there is a cloud that blocks the sun in the sky above each of the stop lines. When there is no cloud that blocks the sun at any of the stop lines, the backlight margin value calculation section 327 obtains the backlight margin value of each stop line in the same manner as the backlight margin value calculation section 307. When there is a stop line above which a cloud that blocks the sun is present, the backlight margin value calculation section 327 sets the backlight margin value to 1 for that stop line and obtains the backlight margin values for other stop lines in the same manner as the backlight margin value calculation section 307. The backlight margin value calculation section 327 transmits the map information, the extracted positions of the stop lines, and the backlight margin value of each of the stop lines to the route backlight margin value calculation section 308.

Figure 15:
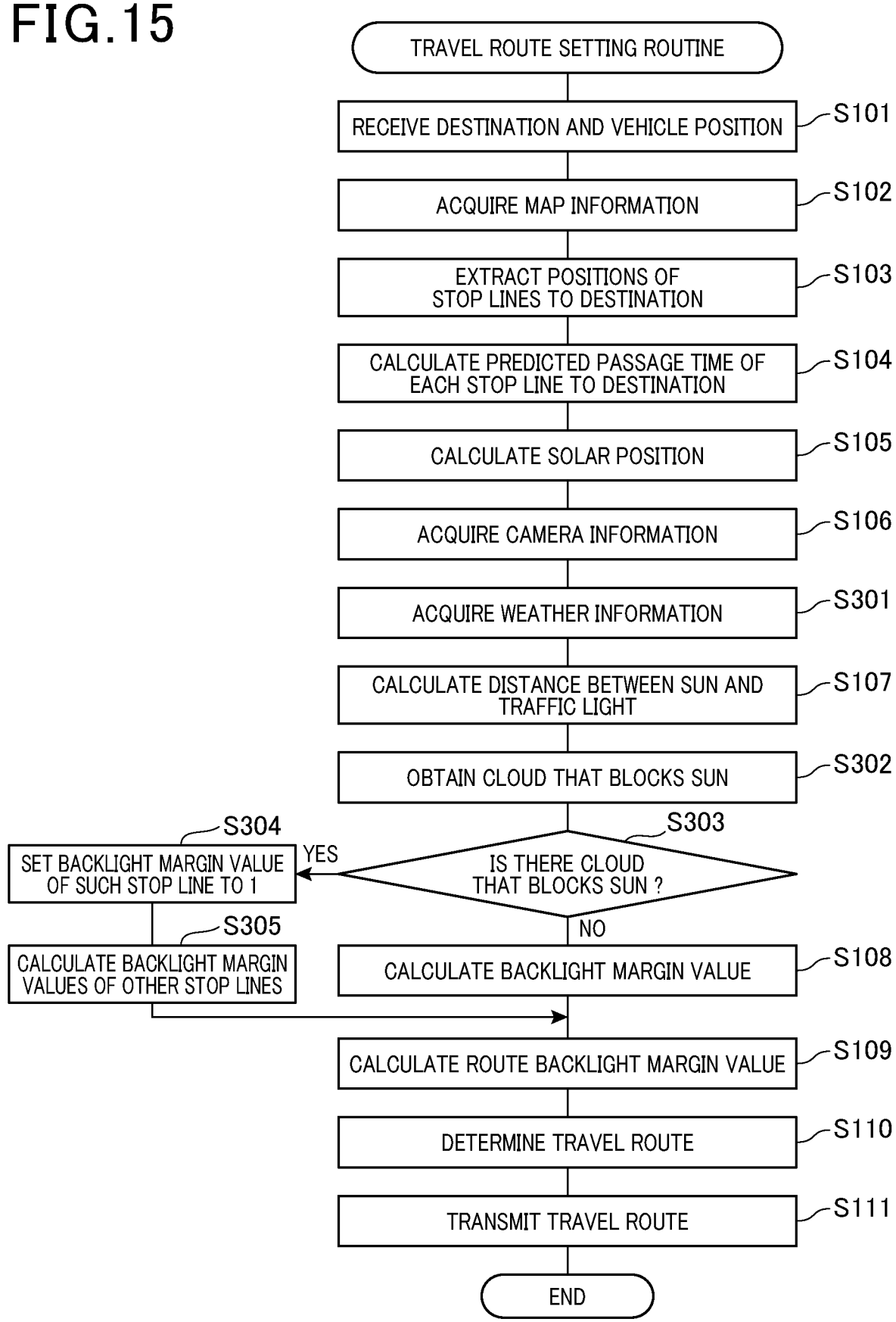
FIG. 15 is a flowchart showing a travel route setting routine of a travel route setting system according to the third embodiment.

Operation of Travel Route Setting System According to Third Embodiment of Present Disclosure FIG. 15 is a flowchart showing the travel route setting routine according to the third embodiment. Note that, the same reference numerals are given to those processes that are the same as the corresponding processes in the travel route setting routine according to the first embodiment, and detailed explanations thereof are omitted.

At step S301, the weather information acquisition section 326 acquires the weather information including the position information of clouds.

At step S302, the backlight margin value calculation section 327 obtains information on the cloud that blocks the sun at the passage time of each of the stop lines based on the position of the sun at the passage time of each stop line, the map information, and the cloud position information of the weather information acquired at step S301.

At step S303, the backlight margin value calculation section 327 determines whether there is a cloud that blocks the sun in the sky above each of the stop lines.

When there is no cloud that blocks the sun at any of the stop lines (NO at step S303), the process proceeds to step S108.

When there is a cloud that blocks the sun (YES at step S303), at step S304, the backlight margin value calculation section 327 sets the backlight margin value to 1 for the stop line above which a cloud that blocks the sun is present.

At step S305, the backlight margin value calculation section 327 obtains the backlight margin values for the stop lines other than the stop line above which a cloud that blocks the sun is present in the same manner as step S108.

As described above, in the travel route setting system according to the embodiment of the present disclosure, the backlight margin value calculation section 317 determines whether there is any shielding object that blocks the sun at the passage time of each of the stop lines as viewed from the position of each stop line based on the position of the sun at the passage time of each stop line and the map information. When a shielding object is present, the backlight margin value of the stop line is calculated to be a value greater than that when there is no shielding object. This enables setting the route that best reduces the risk of failing to detect or erroneously recognizing a traffic light and allows correctly recognizing traffic lights.

Configuration of Travel Route Setting System According to Fourth Embodiment of Present Disclosure Next, the configuration of a travel route setting system 4 according to the fourth embodiment will be described. Note that, the components that are the same as the components of the travel route setting system 1 according to the first embodiment are given the same reference numerals, and detailed explanations thereof are omitted.

Figure 16:
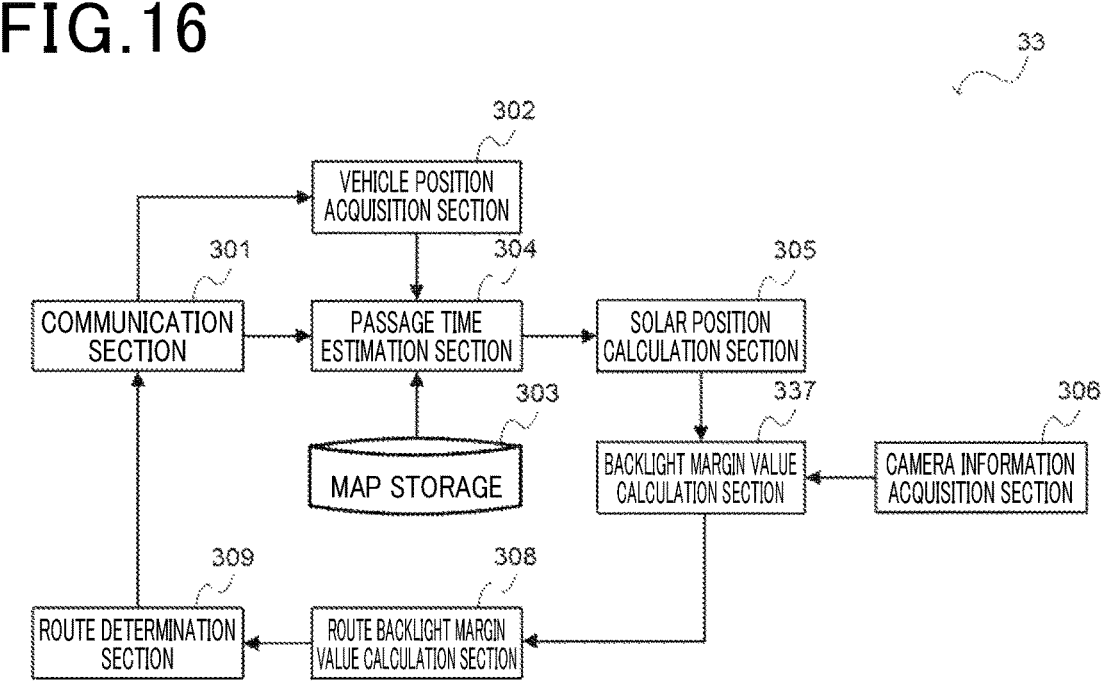
FIG. 16 is a block diagram illustrating an example of a functional configuration of an automated driving center according to a fourth embodiment.

As shown in FIG. 16, an automated driving center 33 according to the present embodiment includes the communication section 301, the vehicle position acquisition section 302, the map storage 303, the passage time estimation section 304, the solar position calculation section 305, the camera information acquisition section 306, a backlight margin value calculation section 337, the route backlight margin value calculation section 308, and the route determination section 309.

When multiple traffic lights appear on the image at the position of any of the stop lines, the backlight margin value calculation section 337 calculates the backlight margin value for each of the traffic lights and sets the maximum one of the backlight margin values of the traffic lights as the backlight margin value of the stop line. The backlight margin value calculation section 327 first calculates the positions of the traffic lights and the position of the sun on the image captured by the camera 10 when the vehicle is located before the stop line, based on the position of the stop line, the position of the sun at the passage time of the stop line, the positions of the multiple traffic lights associated with the stop line, and the camera information. Subsequently, the backlight margin value calculation section 337 determines whether there is a stop line at which multiple traffic lights appear on the image. When there is no stop line at which multiple traffic lights appear, the backlight margin value calculation section 337 performs the same process as the backlight margin value calculation section 307.

Figure 17:
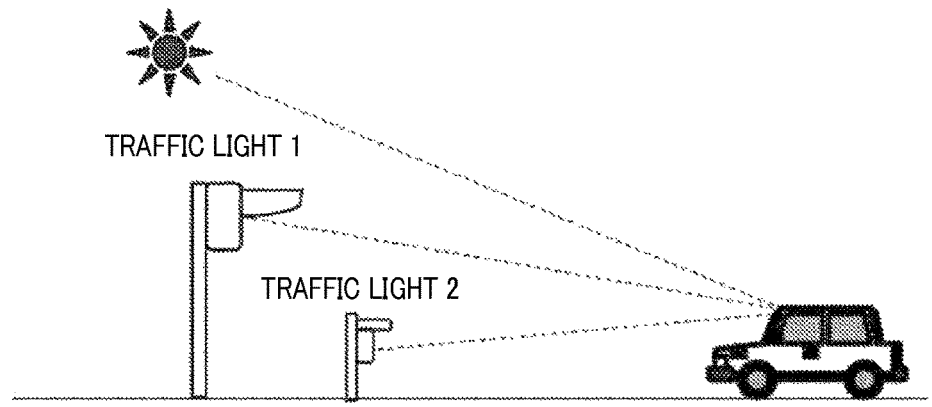
FIG. 17 is a conceptual diagram illustrating a relationship between the position of the camera, the position of the sun, and the positions of traffic lights when a vehicle is located before a stop line.
Figure 18:
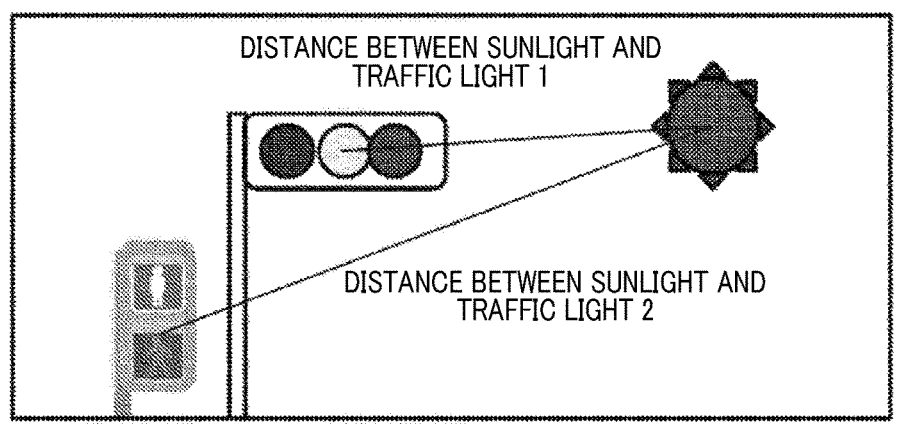
FIG. 18 is a conceptual diagram illustrating an example of an image assumed to be captured by the camera and the distances between the sunlight and the traffic lights.

When there is a stop line at which multiple traffic lights appear on the image, the backlight margin value calculation section 337 calculates the distance between the sunlight and each of the traffic lights, that is, the distance between the position of each of the traffic lights on the image and the position of the sun on the image. FIG. 17 is a conceptual diagram that shows a relationship between the position of the camera 10, the position of the sun, and the positions of multiple traffic lights when the vehicle is located before the stop line. FIG. 18 is an example of the image assumed to be captured by the camera 10 and the distances between the sunlight and the multiple traffic lights. As shown in FIGS. 17 and 18, the backlight margin value calculation section 337 calculates the distance between the sunlight and each of the traffic lights when it is predicted that multiple traffic lights will appear on the image.

Next, the backlight margin value calculation section 337 calculates the backlight margin value for each of the traffic lights and sets the maximum one of the backlight margin values of the traffic lights as the backlight margin value of the stop line. The backlight margin value calculation section 337 transmits the map information, the extracted positions of the stop lines, and the backlight margin value of each of the stop lines to the route backlight margin value calculation section 308.

Figure 19:
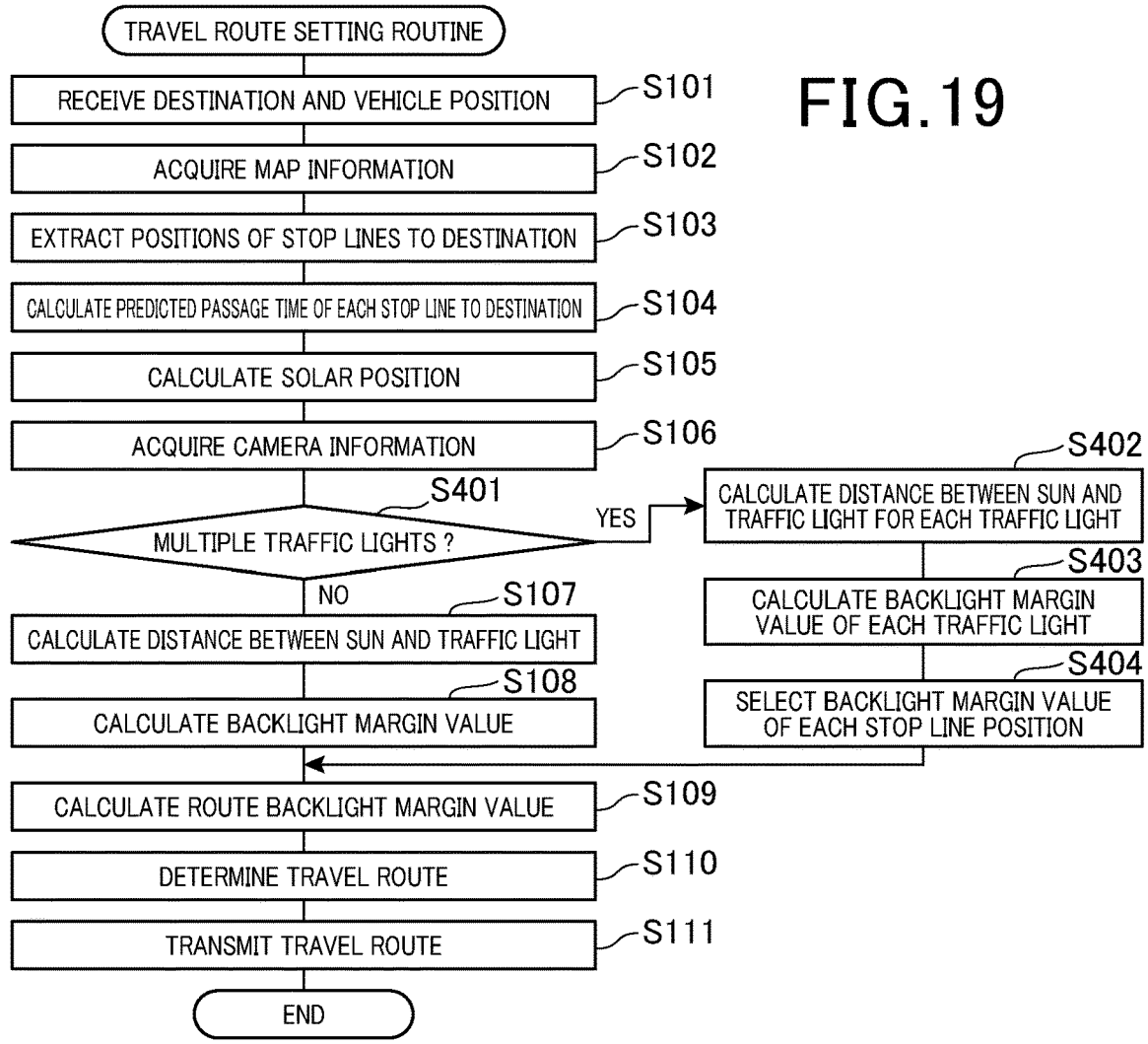
FIG. 19 is a flowchart showing a travel route setting routine of a travel route setting system according to the fourth embodiment.

Operation of Travel Route Setting System According to Fourth Embodiment of Present Disclosure FIG. 19 is a flowchart showing the travel route setting routine according to the fourth embodiment. Note that, the same reference numerals are given to those processes that are the same as the corresponding processes in the travel route setting routine according to the first embodiment, and detailed explanations thereof are omitted.

At step S401, the backlight margin value calculation section 337 determines whether there is a stop line at which multiple traffic lights appear on the image.

When there is no stop line at which multiple traffic lights appear on the image (NO at step S401), the process proceeds to step S107.

When there is a stop line at which multiple traffic lights appear on the image (YES at step S401), at step S402, the backlight margin value calculation section 337 calculates the distance between the sunlight and each of the traffic lights, that is, the distance between the position of each of the traffic lights on the image and the position of the sun on the image.

At step S403, the backlight margin value calculation section 337 calculates the backlight margin value for each of the traffic lights.

At step S404, the backlight margin value calculation section 337 sets the maximum one of the backlight margin values of the traffic lights as the backlight margin value of the stop line.

As described above, when multiple traffic lights appear on the image at the position of any of the stop lines, the travel route setting system according to the embodiment of the present disclosure calculates the backlight margin value for each of the traffic lights and sets the maximum one of the backlight margin values of the traffic lights as the backlight margin value of the stop line. This enables setting the route that best reduces the risk of failing to detect or erroneously recognizing a traffic light and allows correctly recognizing traffic lights.

Configuration of Travel Route Setting System According to Fifth Embodiment of Present Disclosure Next, the configuration of a travel route setting system 5 according to the fifth embodiment will be described. Note that, components that are the same as the components of the travel route setting system 1 according to the first embodiment are given the same reference numerals, and detailed explanations thereof are omitted.

Figure 20:
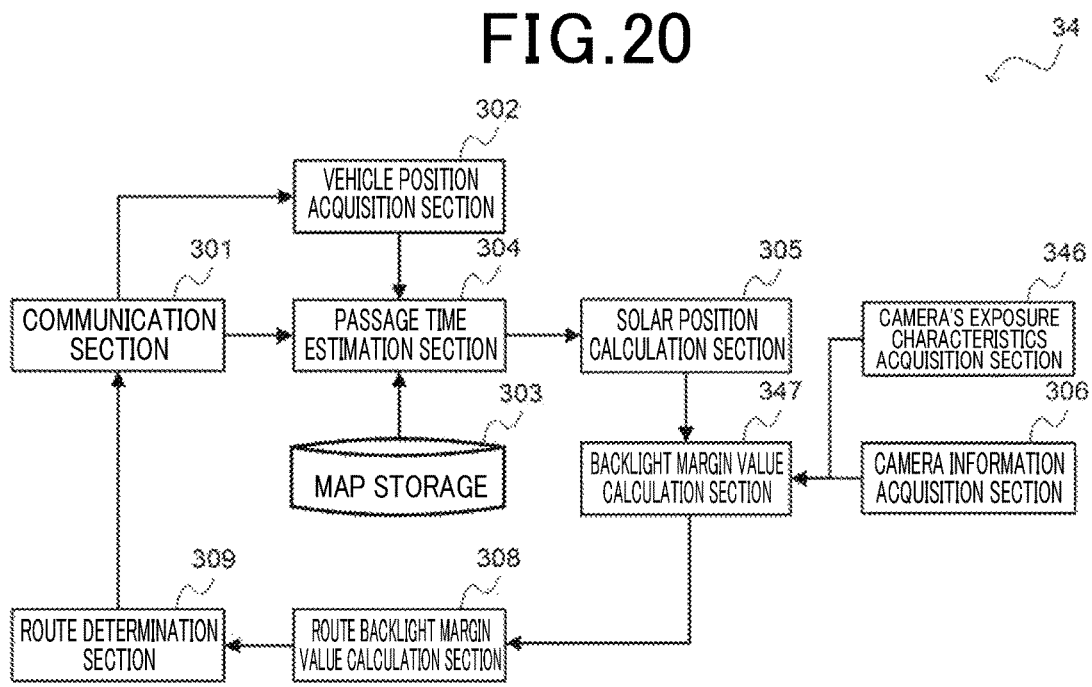
FIG. 20 is a block diagram illustrating an example of a functional configuration of an automated driving center according to a fifth embodiment.

As shown in FIG. 20, an automated driving center 34 according to the present embodiment includes the communication section 301, the vehicle position acquisition section 302, the map storage 303, the passage time estimation section 304, the solar position calculation section 305, the camera information acquisition section 306, a camera's exposure characteristics acquisition section 346, a backlight margin value calculation section 347, the route backlight margin value calculation section 308, and the route determination section 309.

The camera's exposure characteristics acquisition section 346 acquires the exposure characteristics information of the camera 10. Specifically, the camera's exposure characteristics acquisition section 346, or more specifically, the camera information acquisition section 306 acquires the exposure characteristics information including the exposure characteristics of the camera 10 mounted to the vehicle from a database (not shown) that previously holds the exposure characteristics information. The camera's exposure characteristics acquisition section 346 transmits the obtained exposure characteristics information of the camera 10 to the backlight margin value calculation section 347.

The backlight margin value calculation section 347 calculates the backlight margin value of each of the stop lines based on the position of each stop line, the position of the associated traffic light, and the position of the sun by using the formula corresponding to the distance between the traffic light and the sun on the image at the position of the stop line and the exposure characteristics information. Specifically, the backlight margin value calculation section 347 calculates the backlight margin value by using the formula corresponding to the distance between the sunlight and the traffic light and the exposure characteristics information. For example, when the exposure characteristics information meets a predetermined rule, the formula corresponding to the rule is used. In this case, it is only necessary to prepare multiple formulas different from the case of FIG. 7 as in the first embodiment. The backlight margin value calculation section 347 transmits the map information, the extracted positions of the stop lines, and the backlight margin value of each of the stop lines to the route backlight margin value calculation section 308.

Figure 21:
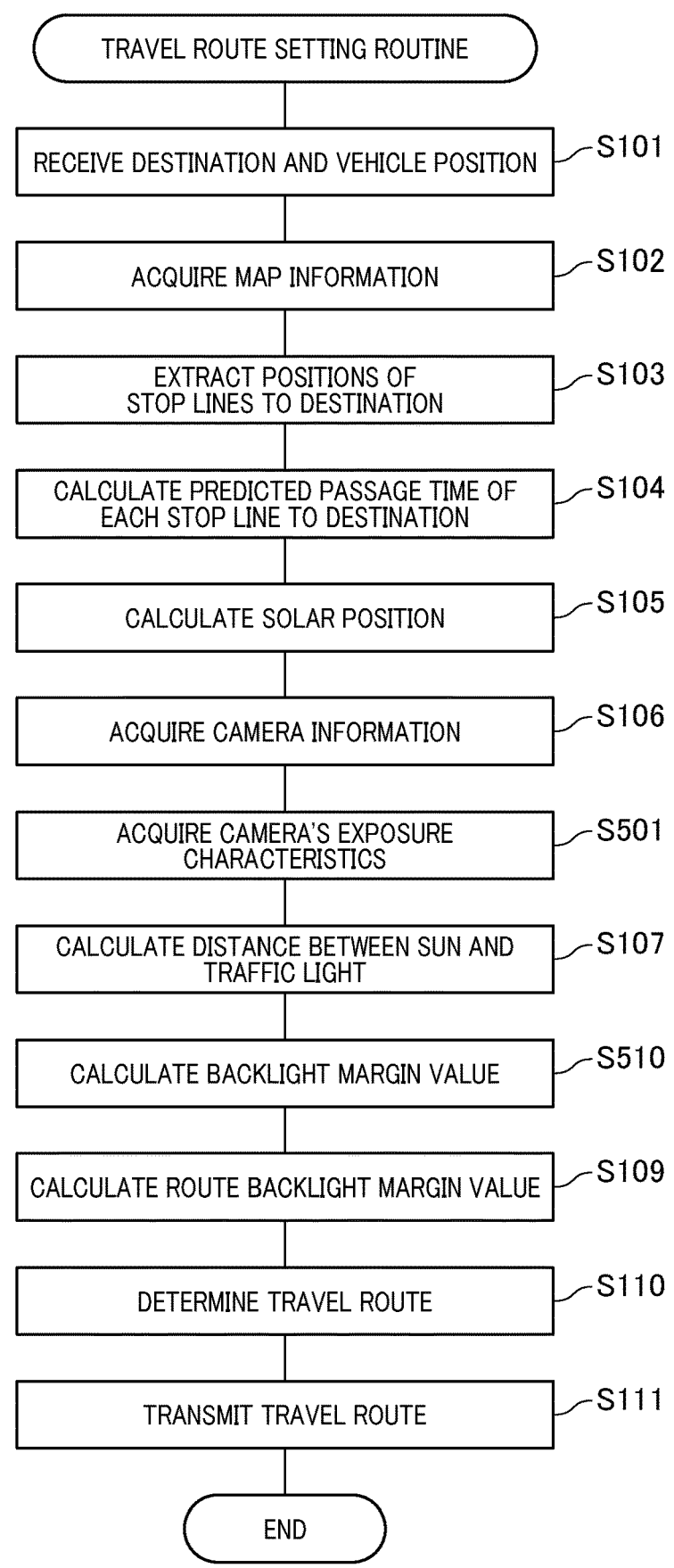
FIG. 21 is a flowchart showing a travel route setting routine of a travel route setting system according to the fifth embodiment.

Operation of Travel Route Setting System According to Fifth Embodiment of Present Disclosure FIG. 21 is a flowchart showing the travel route setting routine according to the fifth embodiment. Note that, the same reference numerals are given to those processes that are the same as the corresponding processes in the travel route setting routine according to the first embodiment, and detailed explanations thereof are omitted.

At step S501, the camera's exposure characteristics acquisition section 346 acquires the exposure characteristics information of the camera 10.

At step S510, the backlight margin value calculation section 347 calculates the backlight margin value of each of the stop lines based on the position of each stop line, the position of the associated traffic light, and the position of the sun by using the formula corresponding to the distance between the traffic light and the sun on the image at the position of the stop line and the exposure characteristics information acquired at step S501.

As described above, the travel route setting system according to the embodiment of the present disclosure further acquires the exposure characteristics information of the camera and calculates the backlight margin value of each of the stop lines based on the position of each stop line, the position of the associated traffic light, and the position of the sun by using the formula corresponding to the distance between the traffic light and the sun on the image at the position of the stop line and the exposure characteristics information, thereby setting the route that best reduces the risk of failing to detect or erroneously recognizing a traffic light and allows correctly recognizing traffic lights.

The present disclosure is not limited to the above embodiments, and many variations and applications are possible without departing from the spirit of the present invention.

For example, in the above embodiments, the travel route setting system includes the processing sections as separate devices, but the structure is not limited to this. All the processing sections may be included in the same device such as the vehicle-mounted device. The input section 201 may be formed on a separate device. For example, the user may input the destination in a communication terminal such as a smartphone, and the destination may be transmitted to the vehicle-mounted device 20 or the automated driving center 30. The camera information such as the angle of view of the camera 10, the mounting angle of the camera 10, the mounting position of the camera 10, and the exposure of the camera 10 may be stored in the vehicle. In this case, the automated driving center 30 only needs to acquire the camera information from the vehicle-mounted device 20.

Furthermore, the above embodiments are described in the context of level 4 automated driving (automated driving in a limited area), but are not limited to this. The embodiments may be applied to other levels of automated driving.

Additionally, when the passage time is at night, the normal travel route selection may be performed on the assumption that the sun is not present, that is, there is no influence of the backlight. In this case, for example, the route by which the vehicle arrives at the destination in the shortest time from the vehicle position only needs to be selected.

In the above-described embodiments, the CPU read software (a program) and executed the program, but the program may be executed by a variety of processors other than the CPU. Examples of the processor, in this case, include a programmable logic device (PLD) that can change the circuit configuration after the manufacture such as a field-programmable gate array (FPGA), and a dedicated electrical circuit, which is a processor including a circuit configuration exclusively designed to execute a specific process, such as an application-specific integrated circuit (ASIC). Furthermore, the abnormality detection program may be executed by one of the varieties of processors or by a combination of two or more processors of the same kind or different kinds (for example, multiple FPGAs or a combination of CPU and FPGA). Additionally, the hardware structure of the variety of processors may be, more specifically, an electric circuit formed by a combination of circuit elements such as semiconductor devices.

Although each of the above embodiments describes a mode in which the program is previously stored (installed) in the ROM 12 or the storage 14, the embodiments are not limited to this. The program may be provided in the form of being stored in a non-transitory storage medium such as a compact disk read-only memory (CD-ROM), a digital versatile disk read-only memory (DVD-ROM), and a universal serial bus (USB) memory. Alternatively, the program may be downloaded from an external device through a network.

Although the present disclosure has been described in accordance with the embodiments, it is understood that the present disclosure is not limited to the embodiments and the configurations thereof. The present disclosure embraces various modifications and deformations that come within the range of equivalency. Additionally, various combinations and forms, or other combinations and forms including only one or more additional elements, or less than all elements are included in the scope and ideas obtainable from the present disclosure.

The following aspects are further disclosed in regard to the above embodiments.

(Aspect 1)

An abnormality detection device comprising:
a memory; and
at least one processor connected to the memory, wherein the processor is configured to
based on an input destination, a vehicle position, which is a position of a vehicle, and map information including information about positions of traffic lights, extract positions of stop lines located before the traffic lights that are present in a traveling direction on each of routes from the vehicle position to the destination and estimate a passage time at which the vehicle passes each of the extracted stop lines,
calculate a position of the sun at the passage time of each of the stop lines based on the position of each stop line and the passage time of each stop line,
calculate, for each of the stop lines, a backlight margin value, which increases with an increase in a distance between the associated traffic light and the sun as viewed from the position of each stop line, based on the position of each stop line, the position of the associated traffic light, and the position of the sun,
calculate a route backlight margin value based on the backlight margin value of each of the stop lines that are present on each of the routes from the vehicle position to the destination, and determine a travel route from the vehicle position to the destination by using the route backlight margin value calculated for each of the routes.

(Aspect 2)

A non-transitory storage medium that stores an abnormality detection program that causes a computer to execute based on an input destination, a vehicle position, which is a position of a vehicle, and map information including information about positions of traffic lights, extracting positions of stop lines located before the traffic lights that are present in a traveling direction on each of routes from the vehicle position to the destination and estimating a passage time at which the vehicle passes each of the extracted stop lines, calculating a position of the sun at the passage time of each of the stop lines based on the position of each stop line and the passage time of each stop line, calculating, for each of the stop lines, a backlight margin value, which increases with an increase in a distance between the associated traffic light and the sun as viewed from the position of each stop line, based on the position of each stop line, the position of the associated traffic light, and the position of the sun, calculating a route backlight margin value based on the backlight margin value of each of the stop lines that is present on each of the routes from the vehicle position to the destination, and determining a travel route from the vehicle position to the destination by using the route backlight margin value calculated for each of the routes.

A travel route setting system according to one aspect of the present disclosure includes a passage time estimation section (304), a solar position calculation section (305), a backlight margin value calculation section (307, 317, 327, 337, 347), a route backlight margin value calculation section (308), and a route determination section (309). Based on an input destination, a vehicle position, which is a position of a vehicle, and map information including information about positions of traffic lights, the passage time estimation section extracts positions of stop lines located before the traffic lights that are present in a traveling direction on each of routes from the vehicle position to the destination and estimates a passage time at which the vehicle passes each of the extracted stop lines. The solar position calculation section calculates a position of the sun at the passage time of each of the stop lines based on the position of each stop line and the passage time of each stop line. The backlight margin value calculation section calculates, for each of the stop lines, a backlight margin value, which increases with an increase in a distance between the associated traffic light and the sun as viewed from the position of each stop line, based on the position of each stop line, the position of the associated traffic light, and the position of the sun. The route backlight margin value calculation section calculates a route backlight margin value based on the backlight margin value of each of the stop lines that are present on each of the routes from the vehicle position to the destination. The route determination section determines a travel route from the vehicle position to the destination by using the route backlight margin value calculated for each of the routes.

A method for setting a travel route according to one aspect of the present disclosure includes: based on an input destination, a vehicle position, which is a position of a vehicle, and map information including information about positions of traffic lights, extracting, by a passage time estimation section, positions of stop lines located before the traffic lights that are present in a traveling direction on each of routes from the vehicle position to the destination and estimating a passage time at which the vehicle passes each of the extracted stop lines; calculating, by a solar position calculation section, a position of the sun at a passage time of each of the stop lines based on the position of each stop line and the passage time of each stop line; calculating, by a backlight margin value calculation section, for each of the stop lines, a backlight margin value, which increases with an increase in a distance between the associated traffic light and the sun as viewed from the position of each stop line, based on the position of each stop line, the position of the associated traffic light, and the position of the sun; calculating, by a route backlight margin value calculation section, a route backlight margin value based on the backlight margin value of each of the stop lines that are present on each of the routes from the vehicle position to the destination; and determining, by a route determination section, a travel route from the vehicle position to the destination by using the route backlight margin value calculated for each of the routes.

A program according to one aspect of the present disclosure is a program that causes a computer to execute a process including: based on an input destination, a vehicle position, which is a position of a vehicle, and map information including information about positions of traffic lights, extracting, by a passage time estimation section, positions of stop lines located before the traffic lights that are present in a traveling direction on each of routes from the vehicle position to the destination and estimating a passage time at which the vehicle passes each of the extracted stop lines; calculating, by a solar position calculation section, a position of the sun at a passage time of each of the stop lines based on the position of each stop line and the passage time of each stop line; calculating, by a backlight margin value calculation section, for each of the stop lines, a backlight margin value, which increases with an increase in a distance between the associated traffic light and the sun as viewed from the position of each stop line, based on the position of each stop line, the position of the associated traffic light, and the position of the sun; calculating, by a route backlight margin value calculation section, a route backlight margin value based on the backlight margin value of each of the stop lines that are present on each of the routes from the vehicle position to the destination; and determining, by a route determination section, a travel route from the vehicle position to the destination by using the route backlight margin value calculated for each of the routes.

In the travel route setting system, the travel route setting method, and the program according to one aspect of the present disclosure, based on an input destination, a vehicle position, which is a position of a vehicle, and map information including information about positions of traffic lights, the passage time estimation section extracts positions of stop lines located before the traffic lights that are present in a traveling direction on each of routes from the vehicle position to the destination and estimates a passage time at which the vehicle passes each of the extracted stop lines. The solar position calculation section calculates a position of the sun at the passage time of each of the stop lines based on the position of each stop line and the passage time of each stop line.

The backlight margin value calculation section calculates, for each of the stop lines, a backlight margin value, which increases with an increase in a distance between the traffic light and the sun as viewed from the position of each stop line, based on the position of each stop line, the position of the associated traffic light, and the position of the sun. The route backlight margin value calculation section calculates a route backlight margin value based on the backlight margin value of each of the stop lines that are present on each of the routes from the vehicle position to the destination. The route determination section determines a travel route from the vehicle position to the destination by using the route backlight margin value calculated for each of the routes.

As described above, the route that reduces the risk of failing to detect or erroneously recognizing a traffic light and allows correctly recognizing traffic lights is set by extracting positions of stop lines located before the traffic lights that are present in a traveling direction on each of routes from the vehicle position to the destination, estimating a passage time at which the vehicle passes each of the extracted stop lines, calculating a position of the sun at the passage time of each of the stop lines based on the position of each stop line and the passage time of each stop line, calculating a backlight margin value, which increases with an increase in a distance between the traffic light and the sun as viewed from the position of each stop line, calculating a route backlight margin value based on the backlight margin value of each of the stop lines that are present on each of the routes from the vehicle position to the destination, and determining a travel route from the vehicle position to the destination by using the route backlight margin value calculated for each of the routes.

The travel route setting system according to one aspect of the present disclosure further includes a camera information acquisition section (306) that acquires camera information including an angle of view of a camera mounted to the vehicle, a mounting angle of the camera, and a mounting position of the camera. When an image of a traffic light is captured by the camera from the position of each stop line, the backlight margin value increases with an increase in a distance between the traffic light on the image and the sun on the image. The backlight margin value calculation section calculates the backlight margin value of each of the stop lines based on the position of each stop line, the position of the associated traffic light, the position of the sun at the passage time of each stop line, and the camera information.

In the travel route setting system according to one aspect of the present disclosure, when the sun does not appear on the image, the backlight margin value calculation section sets the backlight margin value to a value greater than that when the sun appears on the image.

The backlight margin value calculation section of the travel route setting system according to one aspect of the present disclosure determines whether there is any shielding object that blocks the sun at the passage time of each of the stop lines as viewed from the position of each stop line based on the position of the sun at the passage time of each stop line and the map information, and when the shielding object is present, the backlight margin value calculation section sets the backlight margin value of the stop line to a value greater than that when there is no shielding object.

The travel route setting system according to one aspect of the present disclosure further includes a weather information acquisition section (336) that acquires weather information including position information of a cloud, and the shielding object is the cloud.

In the travel route setting system according to one aspect of the present disclosure, the map information further includes feature information, which is information about a position and a height of a feature which may be a building or a natural object on the map, and the shielding object is the feature.

The travel route setting system according to one aspect of the present disclosure further includes a camera's exposure characteristics acquisition section (346) that acquires exposure characteristics information of the camera. The backlight margin value calculation section calculates the backlight margin value by using a formula corresponding to the distance between the traffic light and the sun on the image at the position of each stop line and the exposure characteristics information.

The backlight margin value calculation section of the travel route setting system according to one aspect of the present disclosure calculates, when multiple traffic lights appear on the image at the position of any of the stop lines, the backlight margin value for each of the traffic lights and sets the maximum one of the backlight margin values of the traffic lights as the backlight margin value of the stop line.

The travel route setting system, the travel route setting method, and the program according to the present disclosure set the route that reduces the risk of failing to detect or erroneously recognizing a traffic light and allows correctly recognizing traffic lights.

What is claimed is:

1. A travel route setting system comprising:
   a passage time estimation section, which, based on an input destination, a vehicle position, which is a position of a vehicle, and map information including information about positions of traffic lights, extracts positions of stop lines located before the traffic lights that are present in a traveling direction on each of routes from the vehicle position to the destination and estimates a passage time at which the vehicle passes each of the extracted stop lines;
   a solar position calculation section that calculates a position of the sun at the passage time of each of the stop lines based on the position of each stop line and the passage time of each stop line;
   a camera information acquisition section that acquires camera information including an angle of view of a camera mounted to the vehicle, a mounting angle of the camera, and a mounting position of the camera;
   a backlight margin value calculation section that calculates, for each of the stop lines, a distance between an associated traffic light and the sun on an image when the image of the associated traffic light is captured by the camera based on the position of each stop line, the position of the associated traffic light, the position of the sun at the passage time of each stop line, and the camera information, and calculates a backlight margin value corresponding to the calculated distance on the image based on a relationship between the distance and the backlight margin value previously determined so that the backlight margin value increases as the distance increases;
   a route backlight margin value calculation section that calculates a route backlight margin value based on the backlight margin value of each of the stop lines that are present on each of the routes from the vehicle position to the destination; and
   a route determination section that determines a travel route from the vehicle position to the destination by using the route backlight margin value calculated for each of the routes, wherein
   the vehicle performs automated driving to travel on the travel route to the destination.

2. The travel route setting system according to claim 1, wherein when the sun does not appear on the image, the backlight margin value calculation section sets the backlight margin value to a value greater than that when the sun appears on the image.

3. The travel route setting system according to claim 1, wherein
the backlight margin value calculation section determines whether there is any shielding object that blocks the sun at the passage time of each of the stop lines as viewed from the position of each stop line based on the position of the sun at the passage time of each stop line and the map information, and when there is the shielding object, the backlight margin value calculation section sets the backlight margin value of the stop line to a value greater than that when there is no shielding object.

4. The travel route setting system according to claim 3, wherein
the map information further includes feature information, which is information about a position and a height of a feature including a building and a natural object on the map, and
the shielding object is the feature.

5. The travel route setting system according to claim 3, further comprising a weather information acquisition section that acquires weather information including position information of a cloud, wherein
the shielding object is the cloud.

6. The travel route setting system according to claim 1, wherein,
when a plurality of traffic lights appears on the image at the position of any of the stop lines, the backlight margin value calculation section calculates the backlight margin value for each of the traffic lights and sets the maximum one of the backlight margin values of the traffic lights as the backlight margin value of the stop line.

7. The travel route setting system according to claim 1, further comprising a camera's exposure characteristics acquisition section that acquires exposure characteristics information of the camera, wherein
the backlight margin value calculation section calculates the backlight margin value by using a formula corresponding to the distance between the associated traffic light and the sun on the image at the position of each stop line and the exposure characteristics information.

8. A method for setting a travel route comprising:
based on an input destination, a vehicle position, which is a position of a vehicle, and map information including information about positions of traffic lights, extracting, by a passage time estimation section, positions of stop lines located before the traffic lights that are present in a traveling direction on each of routes from the vehicle position to the destination and estimating a passage time at which the vehicle passes each of the extracted stop lines;
calculating, by a solar position calculation section, a position of the sun at a passage time of each of the stop lines based on the position of each stop line and the passage time of each stop line;
acquiring, by a camera information acquisition section, camera information including an angle of view of a camera mounted to the vehicle, a mounting angle of the camera, and a mounting position of the camera;
calculating, by a backlight margin value calculation section, for each of the stop lines, a distance between an associated traffic light and the sun on an image when the image of the associated traffic light is captured by the camera based on the position of each stop line, the position of the associated traffic light, the position of the sun at the passage time of each stop line, and the camera information, and calculates a backlight margin value corresponding to the calculated distance on the image based on a relationship between the distance and the backlight margin value previously determined so that the backlight margin value increases as the distance increases;
calculating, by a route backlight margin value calculation section, a route backlight margin value based on the backlight margin value of each of the stop lines that are present on each of the routes from the vehicle position to the destination; and
determining, by a route determination section, a travel route from the vehicle position to the destination by using the route backlight margin value calculated for each of the routes, wherein
the vehicle performs automated driving to travel on the travel route to the destination.

9. A non-transitory computer-readable storage medium storing a program that causes a computer to execute a process comprising:
based on an input destination, a vehicle position, which is a position of a vehicle, and map information including information about positions of traffic lights, extracting, by a passage time estimation section, positions of stop lines located before the traffic lights that are present in a traveling direction on each of routes from the vehicle position to the destination and estimating a passage time at which the vehicle passes each of the extracted stop lines;
calculating, by a solar position calculation section, a position of the sun at a passage time of each of the stop lines based on the position of each stop line and the passage time of each stop line;
acquiring, by a camera information acquisition section, camera information including an angle of view of a camera mounted to the vehicle, a mounting angle of the camera, and a mounting position of the camera;
calculating, by a backlight margin value calculation section, for each of the stop lines, a distance between an associated traffic light and the sun on an image when the image of the associated traffic light is captured by the camera based on the position of each stop line, the position of the associated traffic light, the position of the sun at the passage time of each stop line, and the camera information, and calculates a backlight margin value corresponding to the calculated distance on the image based on a relationship between the distance and the backlight margin value previously determined so that the backlight margin value increases as the distance increases;
calculating, by a route backlight margin value calculation section, a route backlight margin value based on the backlight margin value of each of the stop lines that are present on each of the routes from the vehicle position to the destination; and
determining, by a route determination section, a travel route from the vehicle position to the destination by using the route backlight margin value calculated for each of the routes, wherein
the vehicle performs automated driving to travel on the travel route to the destination.

* * * * *